US012111387B2

(12) United States Patent
Zhou et al.

(10) Patent No.: US 12,111,387 B2
(45) Date of Patent: Oct. 8, 2024

(54) SIGNAL PROCESSING METHOD, RADAR SYSTEM, AND VEHICLE

(71) Applicant: HUAWEI TECHNOLOGIES CO., LTD., Shenzhen (CN)

(72) Inventors: Mu Zhou, Shanghai (CN); Jinnan Liu, Beijing (CN); Chen Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 583 days.

(21) Appl. No.: 17/345,039

(22) Filed: Jun. 11, 2021

(65) Prior Publication Data

US 2022/0035019 A1    Feb. 3, 2022

Related U.S. Application Data

(63) Continuation of application No. PCT/CN2018/120730, filed on Dec. 12, 2018.

(51) Int. Cl.
*G01S 13/58* (2006.01)
*G01S 7/35* (2006.01)
(Continued)

(52) U.S. Cl.
CPC .......... *G01S 13/584* (2013.01); *G01S 13/003* (2013.01); *G01S 13/931* (2013.01); *G01S 7/356* (2021.05)

(58) Field of Classification Search
CPC .... G01S 13/584; G01S 13/003; G01S 13/931; G01S 7/356
See application file for complete search history.

(56) References Cited

U.S. PATENT DOCUMENTS

| 9,869,762 B1 | 1/2018 | Alland et al. |
| 2008/0088498 A1 | 4/2008 | Suzuki et al. |

(Continued)

FOREIGN PATENT DOCUMENTS

| CN | 103941252 A | 7/2014 |
| CN | 106796283 A | 5/2017 |

(Continued)

OTHER PUBLICATIONS

Matthias Kronauge et al, Radar Target Detection and Doppler Ambiguity Resolution, 11-th International Radar Symposium, Date of Conference: Jun. 16-18, 2010, Date Added to IEEE Xplore: Aug. 12, 2010, total 4 pages.

(Continued)

*Primary Examiner* — Marc Anthony Armand
(74) *Attorney, Agent, or Firm* — Rimon PC

(57) ABSTRACT

Embodiments of this application disclose a signal processing method, a radar system, and a vehicle. The method is applied to a radar system including an array antenna. The method includes: sequentially transmitting signals according to a first transmission sequence through M transmit antennas, where the first transmission sequence is different from a sequence that is formed by arranging the M transmit antennas based on spatial locations; receiving, through N receive antennas, echo signals that are formed after a target reflects the transmitted signals, where M and N are positive integers, and M is greater than 2; and measuring a parameter of the target based on the echo signals. According to the embodiments of this application, correlation between space and a Doppler phase shift is reduced by changing a switching order of transmit antennas.

20 Claims, 18 Drawing Sheets

(51) Int. Cl.
G01S 13/00 (2006.01)
G01S 13/931 (2020.01)

(56) References Cited

U.S. PATENT DOCUMENTS

| | | | |
|---|---|---|---|
| 2013/0069819 A1* | 3/2013 | Braun | G01S 13/935 342/156 |
| 2016/0131752 A1 | 5/2016 | Jansen et al. | |
| 2016/0204840 A1 | 7/2016 | Liu | |
| 2016/0291130 A1 | 10/2016 | Ginsburg et al. | |
| 2017/0227636 A1* | 8/2017 | Moulder | G01S 13/89 |
| 2017/0309997 A1 | 10/2017 | Alland et al. | |
| 2018/0011170 A1 | 1/2018 | Rao et al. | |
| 2018/0031674 A1 | 2/2018 | Bordes et al. | |

FOREIGN PATENT DOCUMENTS

| | | |
|---|---|---|
| CN | 108802718 A | 11/2018 |
| EP | 3021132 A1 | 5/2016 |
| JP | H11118913 A | 4/1999 |
| JP | 2017173227 A | 9/2017 |
| JP | 2018072014 A | 5/2018 |
| WO | 2018138725 A1 | 8/2018 |
| WO | 2018142395 A1 | 8/2018 |
| WO | 2018142396 A1 | 8/2018 |

OTHER PUBLICATIONS

Dominik Zoeke et al, Phase Migration Effects in Moving Target Localization Using Switched MIMO Arrays, Proceedings of the 12th European Radar Conference, Sep. 9-11, 2015, Paris, France, total 4 pages.

Sujeet Patole et al, Automotive Radars A review of signal processing techniques, Signal Processing for Smart Vehicle Technologies: Part 2, IEEE Signal Processing Magazine, Mar. 2017, total 22 pages.

Fabian Roos et al, Enhancement of Doppler Unambiguity for Chirp-Sequence Modulated TDM-MIMO Radars, 2018 IEEE, total 5 pages.

Frank Meinl et al, Real-Time Data Preprocessing for High-Resolution MIMO Radar Sensors, Institute of Microelectronic Systems, Robert Bosch GmbH, Apr. 2017, total 24 pages.

Takuya Ohashi et. al.; DOA Estimation Error Analysis of Moving Target by Using TDM-MIMO Radar; The Institute of Electronics, Information and Communication Engineers—Journal B [online]; Japan; The Institute of Electronics, Information and Communication Engineers; Jul. 1, 2018; vol. J101-B, No. 7; pp. 528-538; ISSN: 1881-0209.

* cited by examiner

S22: Generate a first transmission sequence, where the first transmission sequence is different from a sequence that is formed by arranging M transmit antennas based on spatial locations, and M is a positive integer greater than 2

S24: Control the M transmit antennas to sequentially transmit signals according to the first transmission sequence S2: Sequentially transmit signals according to a first transmission sequence through M transmit antennas, where the first transmission sequence is different from a sequence that is formed by arranging the M transmit antennas based on spatial locations, and M is a positive integer greater than 2

S4: Receive, through N receive antennas, echo signals that are formed after a target reflects the transmitted signals, where N is a positive integer S6: Measure a parameter of the target based on the echo signals

FIG. 5A

S62: Calculate, based on a first signal, a distance–Doppler graph corresponding to each virtual receive antenna, to obtain M*N distance–Doppler graphs, where the virtual receive antenna is an array element in a virtual MIMO array including M transmit antennas and N receive antennas, and the distance–Doppler graph is divided into a plurality of distance–Doppler units arranged in an array S64: Perform Doppler phase compensation for the first time on data of a selected distance–Doppler unit in a first distance–Doppler graph by using a first Doppler phase compensation amount that is determined based on an order of a transmit antenna $T_x$ in a first transmission sequence, where the first distance–Doppler graph is a distance–Doppler graph corresponding to any virtual receive antenna in a virtual MIMO subarray corresponding to the transmit antenna $T_x$, the transmit antenna $T_x$ is any transmit antenna in the M transmit antennas, and the first distance–Doppler unit is a unit that is determined based on a first Doppler frequency and a first distance and that is in the distance–Doppler graph S66: Recover second Doppler frequencies of first distance–Doppler units based on first Doppler frequencies and data that is obtained after Doppler phase compensation is performed for the first time for the first distance–Doppler units in the M*N distance–Doppler graphs

FIG. 5B

S6611: Perform, by using a second Doppler phase compensation amount that is determined based on a first aliasing coefficient and an order of a transmit antenna $T_x$ in a preset transmission sequence, Doppler phase compensation for the second time on data obtained after Doppler phase compensation is performed for the first time for a selected distance–Doppler unit in a first distance–Doppler graph, where the first aliasing coefficient is any aliasing coefficient in an aliasing coefficient set, and the aliasing coefficient set includes 0 and a positive integer less than M

S6612: Perform, in at least one angle, coherent superposition on data obtained after Doppler phase compensation is performed for the second time for selected distance–Doppler units in M1 distance–Doppler graphs, and perform incoherent superposition on data obtained after the coherent superposition, to obtain first signal strengths, where the M1 distance–Doppler graphs include the M1 distance–Doppler graphs, the M distance–Doppler graphs include a distance–Doppler graph corresponding to any virtual receive antenna in a virtual MIMO subarray corresponding to a receive antenna $R_y$, the receive antenna $R_y$ is any receive antenna in N receive antennas, M1 is a positive integer, and 2≤M1≤M

S6613: Perform incoherent superposition on first signal strengths respectively corresponding to N1 receive antennas, to obtain second signal strengths, where the N receive antennas include the N1 receive antennas, and N1 is a positive integer not greater than N

S6614: Determine that a second aliasing coefficient is an aliasing coefficient that enables the second signal to meet a first condition in the aliasing coefficient set

S6615: Recover a second Doppler frequency of a first distance–Doppler unit based on the second aliasing coefficient and a first Doppler frequency

FIG. 7A

S6322: Perform, in a plurality of angles, coherent superposition on data of first distance–Doppler units in N2 distance–Doppler graphs, and perform incoherent superposition on data obtained after the coherent superposition, to obtain third signal strengths, where N distance–Doppler graphs include the N2 distance–Doppler graphs, the N distance–Doppler graphs include a distance–Doppler graph corresponding to any virtual receive antenna in a virtual MIMO subarray corresponding to a transmit antenna $T_x$, and N2 is a positive integer not greater than N S6324: Perform incoherent superposition on third signal strengths respectively corresponding to M2 transmit antennas, to obtain fourth signal strengths, where M transmit antennas include the M2 transmit antennas, and M2 is a positive integer not greater than M S6326: Determine that a distance–Doppler unit in which a target is located is a distance–Doppler unit that enables the fourth signal strength to meet a second condition in a plurality of distance–Doppler units

FIG. 8B

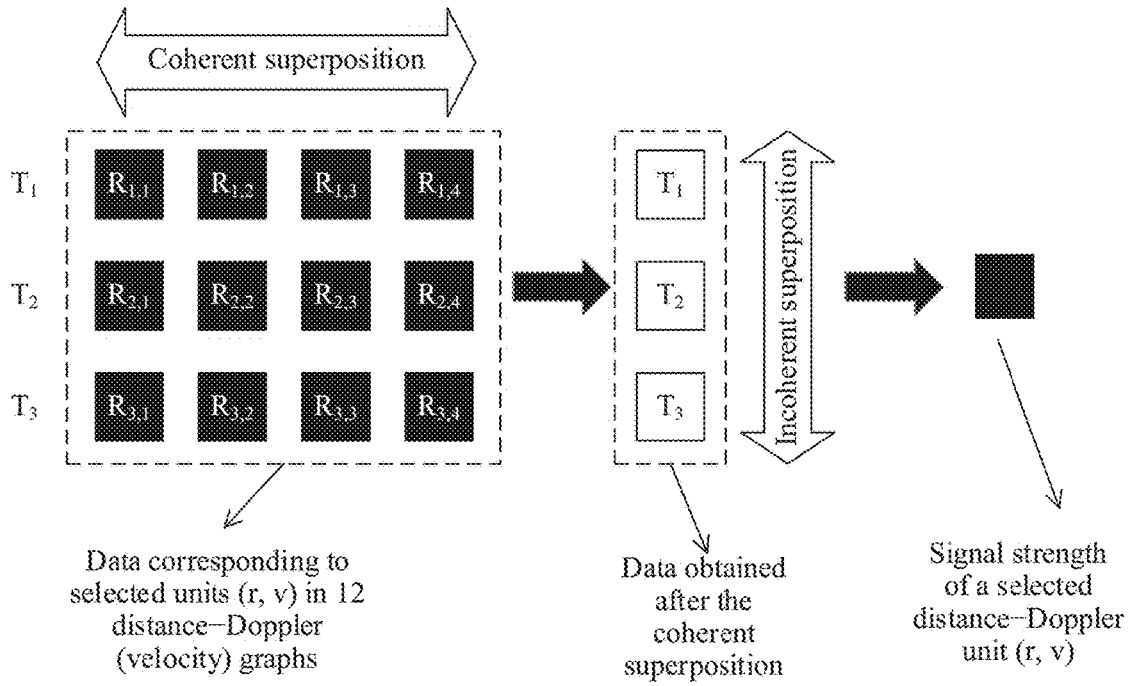

FIG. 8C

SIGNAL PROCESSING METHOD, RADAR SYSTEM, AND VEHICLE

CROSS-REFERENCE TO RELATED APPLICATIONS

This application is a continuation of International Application No. PCT/CN2018/120730, filed on Dec. 12, 2018, the disclosure of which is hereby incorporated by reference in its entirety.

TECHNICAL FIELD

This application relates to the field of technologies, and in particular, to a signal processing method, a radar system, and a vehicle.

BACKGROUND

As an important function of future vehicles, automated driving develops rapidly. A vehicle-mounted radar, especially a vehicle-mounted millimeter-wave radar, is an indispensable component for a sensing function of an autonomous vehicle. In comparison with another vehicle-mounted sensing device (for example, a laser radar, an ultrasonic radar, or a camera), the vehicle-mounted radar has the following features: The vehicle-mounted radar can work in an all-weather environment, provide a good velocity measurement function, and sense an object that cannot be detected by another sensor.

Angular resolution and precision of a conventional vehicle-mounted radar are generally lower than those of a laser radar. Currently, an important target of the development of the vehicle-mounted radar is to improve the angular resolution (horizontal and vertical) and the precision to those of the laser radar. To reach such angular resolution, an antenna aperture needs to be increased for the vehicle-mounted radar.

Multiple-input multi-output (MIMO) is an important method for increasing the antenna aperture and implementing high resolution for the vehicle-mounted radar. The MIMO includes time division (TDM) MIMO and code division (CDM) MIMO. Because the TDM MIMO has advantages of simple reception processing, no interference between transmit antennas, a reduced requirement for transmission and reception isolation, and supportive for transmission performed by a large quantity of transmit antennas in turn, the TDM MIMO becomes an important research direction for increasing the antenna aperture and implementing the high resolution for the vehicle-mounted radar. However, the TDM MIMO causes the following problems:

1. A maximum velocity measurement range for the MIMO with M transmit antennas is reduced by M times in comparison with that for SIMO with a single antenna. Aliasing occurs to velocities beyond the velocity measurement range to obtain low velocities.

2. A Doppler phase shift exists between virtual receive antennas corresponding to transmit antennas. It is difficult to form a large-aperture array in a highly dynamic environment.

To recover a velocity measurement range of the vehicle-mounted radar, Doppler phase compensation needs to be performed when an echo signal received by a receive antenna is processed. However, in the prior art, switching is continuously performed on transmit antennas in an order of spatial locations of the transmit antennas. Strong coupling exists between a Doppler phase shift and a phase of an array response. As a result, the same target appears at a plurality of velocities and angles. A velocity before aliasing of the target cannot be uniquely recovered. Reliability is poor.

SUMMARY

This application provides a signal processing method, a radar system, and a vehicle. Correlation between space and a Doppler phase shift is reduced by changing a switching order of transmit antennas. In this way, a parameter of a target can be recovered, to improve reliability of a result of signal analysis.

According to a first aspect, an embodiment of this application provides a signal processing method. The signal processing method is applied to a radar system including an array antenna. The method includes: sequentially transmitting signals according to a first transmission sequence through M transmit antennas, where the first transmission sequence is different from a sequence that is formed by arranging the M transmit antennas based on spatial locations; receiving, through N receive antennas, echo signals that are formed after a target reflects the transmitted signals, where M and N are positive integers, and M is greater than 2; and measuring a parameter of the target based on the echo signals.

It should be understood that the steps in this embodiment of this application may be performed by the same entity or by different entities that may include but is not limited to a radar system, or modules or components in a radar system, or a vehicle-mounted unit in a vehicle, or the like. This embodiment of this application is described by using an example in which a radar system is an execution entity.

In this method, correlation between space and a Doppler phase shift is reduced by changing a switching order of transmit antennas. In this way, the parameter of the target can be recovered, to improve reliability of a result of signal analysis.

In a possible implementation, the first transmission sequence is a sequence that is obtained by transforming arrangement of at least two transmit antennas in a sequence that is formed by arranging the M transmit antennas based on the spatial locations.

In a possible implementation, any two adjacent transmit antennas in the sequence that is formed by arranging the M transmit antennas based on the spatial locations are not adjacent in the first transmission sequence.

By performing this method, two spatially adjacent transmit antennas transmit signals in a non-adjacent order, thereby further reducing correlation between space and a Doppler phase shift and improving reliability of a result of signal analysis.

In a possible implementation, the M transmit antennas are M physical antennas, or the M antennas are obtained by multiplexing at least one of P physical antennas. P is a positive integer, and $3 \leq P \leq M$.

When a quantity of physical antennas that can be used as transmit antennas in the radar system is less than M, the physical antennas are multiplexed in a time division manner to transmit the signals through the M transmit antennas, so that the signal processing method is flexibly applied to various radar systems.

In a possible implementation, an implementation method in which the radar system measures the parameter of the target based on the echo signals may include: first, calculating, based on the echo signals, a distance-Doppler graph corresponding to each virtual receive antenna, to obtain M*N distance-Doppler graphs, where the virtual receive antenna is an array element in a virtual MIMO array including the M transmit antennas and the N receive antennas, and the distance-Doppler graph is divided into a plurality of distance-Doppler units arranged in an array; performing Doppler phase compensation for the first time on data of a first distance-Doppler unit in a first distance-Doppler graph by using a first Doppler phase compensation amount that is determined based on an order of a transmit antenna $T_x$ in the first transmission sequence, where the first distance-Doppler graph is a distance-Doppler graph corresponding to any virtual receive antenna in a virtual MIMO subarray corresponding to the transmit antenna $T_x$, the transmit antenna $T_x$ is any transmit antenna in the M transmit antennas, and the first distance-Doppler unit is a unit that is determined based on a first Doppler frequency and a first distance and that is in the distance-Doppler graph; and further recovering second Doppler frequencies of first distance-Doppler units based on first Doppler frequencies and data that is obtained after Doppler phase compensation is performed for the first time for the first distance-Doppler units in the M*N distance-Doppler graphs.

By performing this method, when the radar system processes the echo signals received by the receive antennas, the radar system performs Doppler phase compensation on corresponding data of a transmit antenna by using a Doppler phase compensation amount that is determined based on an order of the transmit antenna corresponding to an echo signal in the first transmission sequence, to implement differentiated compensation on signals transmitted by different transmit antennas. In this way, a Doppler phase shift is greatly reduced, to recover a Doppler frequency, so that the measured parameter of the target is more accurate.

Optionally, a specific implementation in which the radar system recovers the second Doppler frequencies of the first distance-Doppler units based on the first Doppler frequencies and the data that is obtained after Doppler phase compensation is performed for the first time for the first distance-Doppler units in the M*N distance-Doppler graphs may be as follows: The radar system performs, by using a second Doppler phase compensation amount that is determined based on a first aliasing coefficient and the order of the transmit antenna $T_x$ in the first transmission sequence, Doppler phase compensation for the second time on the data obtained after Doppler phase compensation is performed for the first time for the first distance-Doppler unit in the first distance-Doppler graph, where the first aliasing coefficient is any aliasing coefficient in an aliasing coefficient set, and the aliasing coefficient set includes 0 and a positive integer less than M; and further recovers the second Doppler frequencies of the first distance-Doppler units based on the first Doppler frequencies and data that is obtained after Doppler phase compensation is performed for the second time for the first distance-Doppler units in the M*N distance-Doppler graphs.

Further, an implementation of recovering the second Doppler frequencies of the first distance-Doppler units based on the first Doppler frequencies and the data that is obtained after Doppler phase compensation is performed for the second time for the first distance-Doppler units in the M*N distance-Doppler graphs may be as follows: The radar system may perform, in at least one angle, coherent superposition on data obtained after Doppler phase compensation is performed for the second time for first distance-Doppler units in M1 distance-Doppler graphs, and perform incoherent superposition on data obtained after the coherent superposition, to obtain first signal strengths, where M distance-Doppler graphs include the M1 distance-Doppler graphs, the M distance-Doppler graphs include a distance-Doppler graph corresponding to any virtual receive antenna in a virtual MIMO subarray corresponding to a receive antenna $R_y$, the receive antenna $R_y$ is any receive antenna in the N receive antennas, M1 is a positive integer, and 2≤M1≤M; perform incoherent superposition on first signal strengths respectively corresponding to N1 receive antennas, to obtain second signal strengths, where the N receive antennas include the N1 receive antennas, and N1 is a positive integer not greater than N; further determine that a second aliasing coefficient is an aliasing coefficient that enables the second signal strength to meet a first condition in the aliasing coefficient set; and recover the second Doppler frequencies of the first distance-Doppler units based on the second aliasing coefficient and the first Doppler frequencies.

By performing this method, when the radar system processes the echo signals received by the receive antennas, the radar system performs Doppler phase compensation for the second time on corresponding data of a transmit antenna by using a Doppler phase compensation amount that is determined based on an aliasing coefficient and an order of the transmit signal corresponding to an echo signal in the first transmission sequence; and calculates a second signal strength of a distance-Doppler unit through coherent superposition and incoherent superposition in a plurality of angles. In this way, a second Doppler frequency of the distance-Doppler unit can be recovered, and the parameter of the target can be uniquely determined based on the recovered second Doppler frequency, to improve reliability of a result of signal analysis.

Further, an implementation in which the radar system determines that the second aliasing coefficient is the aliasing coefficient that enables the second signal strength to meet the first condition in the aliasing coefficient set may be as follows: The radar system may determine that the second aliasing coefficient is an aliasing coefficient that enables the second signal strength to be greater than a first threshold in the aliasing coefficient set; or the radar system determines that the second aliasing coefficient is an aliasing coefficient that enables the second signal strength to be the largest in the aliasing coefficient set.

In a possible implementation, the first distance-Doppler unit may be a distance-Doppler unit in which the target is located. The radar system may further determine the distance-Doppler unit in which the target is located, before the radar system performs Doppler phase compensation for the first time on the data of the first distance-Doppler unit in the first distance-Doppler graph by using the first Doppler phase compensation amount that is determined based on the order of the transmit antenna $T_x$ in the first transmission sequence. In this case, a specific implementation in which the radar system measures the parameter of the target based on the echo signals may be as follows: The radar system may directly measure the parameter of the target based on the second Doppler frequency and/or the second aliasing coefficient.

By performing this method, detection is performed on the target before recovery of the second Doppler frequency, and the recovery of the second Doppler frequency is implemented only for the distance-Doppler unit including the target, thereby greatly reducing complexity of data processing, shortening a reaction time of the radar system, and quickly measuring the parameter of the target.

In a possible implementation, the first distance-Doppler unit may be any distance-Doppler unit in the plurality of distance-Doppler units. The radar system may determine a distance-Doppler unit in which the target is located, after the radar system recovers the second Doppler frequencies of the first distance-Doppler units based on the first Doppler frequencies and the data that is obtained after Doppler phase compensation is performed for the first time for the first distance-Doppler units in the M*N distance-Doppler graphs. In this case, a specific implementation in which the radar system measures the parameter of the target based on the echo signals may be as follows: The radar system may measure the parameter of the target based on a second Doppler frequency recovered for the distance-Doppler unit in which the target is located and/or a second aliasing coefficient determined for the distance-Doppler unit in which the target is located.

Optionally, that the radar system determines the distance-Doppler unit in which the target is located may include but is not limited to the following three implementations:

Implementation 1:

The radar system may perform incoherent superposition on data of second distance-Doppler units in distance-Doppler graphs separately corresponding to W virtual receive antennas, to obtain signal strengths of the second distance-Doppler units, where the second distance-Doppler unit is any distance-Doppler unit in the plurality of distance-Doppler units, W is a positive integer not greater than M*N; and further, determine that the distance-Doppler unit in which the target is located is a distance-Doppler unit whose signal strength meets a second condition in the plurality of distance-Doppler units.

Implementation 2:

The radar system may perform coherent superposition in a plurality of angles on data of second distance-Doppler units in N2 distance-Doppler graphs, and perform incoherent superposition on the data obtained after the coherent superposition, to obtain third signal strengths, where N distance-Doppler graphs include the N2 distance-Doppler graphs, the N distance-Doppler graphs include a distance-Doppler graph corresponding to any virtual receive antenna in the virtual MIMO subarray corresponding to the transmit antenna $T_x$, the second distance-Doppler unit is any distance-Doppler unit in the plurality of distance-Doppler units, and N2 is a positive integer not greater than N; further, perform incoherent superposition of third signal strengths respectively corresponding to M2 transmit antennas, to obtain fourth signal strengths, where M transmit antennas include the M2 transmit antennas, and M2 is a positive integer not greater than M; and determine that the distance-Doppler unit in which the target is located is a distance-Doppler unit whose fourth signal strength meets a second condition in the plurality of distance-Doppler units.

In a specific implementation, the second condition may be that the signal strength or the fourth signal strength is the largest, or the signal strength or the fourth signal strength is greater than a preset threshold, or the like. This is not limited in this embodiment of this application.

Implementation 3:

In Implementation 2, "data of second distance-Doppler units in N2 distance-Doppler graphs" for coherent superposition in a plurality of angles may be data obtained after Doppler phase compensation is performed for the first time and/or Doppler phase compensation is performed for the second time for second distance-Doppler units in N2 distance-Doppler graphs.

By performing this method, when detection is performed on the target, it is more accurate to perform detection on the target based on the data obtained after compensation.

In a possible implementation, the parameter of the target may include a relative distance between the radar system and the target. The distance-Doppler unit in which the target is located is a unit that is determined based on a third Doppler frequency and a second distance and that is in the distance-Doppler graph. The second distance is the relative distance of the target.

In a possible implementation, the parameter of the target may include a relative velocity between the radar system and the target.

$$v_p = \frac{\lambda_c f_p}{2}$$

$v_p$ represents the relative velocity, $f_p$ represents the second Doppler frequency recovered for the distance-Doppler unit in which the target is located, and $\lambda_c$ represents a carrier wavelength.

In a possible implementation, the parameter of the target includes a relative angle between the radar system and the target. A method for measuring the relative angle of the target may be as follows: The radar system performs, by using the first Doppler phase compensation amount and the second Doppler phase compensation amount that are determined based on a third aliasing coefficient, a third time of Doppler phase compensation on the data of the distance-Doppler unit in which the target is located, where the third aliasing coefficient is the second aliasing coefficient determined for the distance-Doppler unit in which the target is located; and further measures the relative angle of the target based on the data obtained after the third time of Doppler phase compensation of the distance-Doppler unit in which the target is located.

By performing this method, the angle measurement and the recovery of the second Doppler frequency are separately performed. No correlation exists between the angle measurement and the recovery of the second Doppler frequency, so that the measured angle is more accurate.

According to a second aspect, an embodiment of this application further provides a radar system. The radar system may include a transmitting unit, a receiving unit, and a processing unit.

The transmitting unit is configured to sequentially transmit signals according to a first transmission sequence through M transmit antennas. The first transmission sequence is different from a sequence that is formed by arranging the M transmit antennas based on spatial locations.

The receiving unit is configured to receive, through N receive antennas, echo signals that are formed after a target reflects the transmitted signals. M and N are positive integers, and M is greater than 2.

The processing unit is configured to measure a parameter of the target based on the echo signals.

Optionally, the foregoing units may be implemented by hardware or by software in cooperation with hardware. The units are specifically configured to implement the signal processing method according to any implementation of the first aspect.

According to a third aspect, an embodiment of this application further provides a radar system, including at least M transmit antennas, at least N receive antennas, a transmitting module coupled to the at least M transmit antennas, a receiving module coupled to the at least N receive antennas, and at least one processing module.

The transmitting module is configured to sequentially transmit signals according to a first transmission sequence through the M transmit antennas. The first transmission sequence is different from a sequence that is formed by arranging the M transmit antennas based on spatial locations.

The receiving module is configured to receive, through the N receive antennas, echo signals that are formed after a target reflects the transmitted signals. M and N are positive integers, and M is greater than 2.

The processing module is configured to measure a parameter of the target based on the echo signals.

The transmitting module may include at least one transmitter. The receiving module may include at least one receiver. The processing module may include at least one processor and a memory.

Optionally, the transmitting module and the receiving module may be integrated into a radio frequency chip, or one or more transmitters in the transmitting module and one or more receivers in the receiving module may be integrated into one radio frequency chip.

It may be understood that the processing module may include a processor and a memory. The memory is configured to store data and an instruction. The processor is configured to invoke the data and the instruction stored in the memory, to perform the signal processing method according to any implementation of the first aspect.

According to a fourth aspect, an embodiment of this application further provides a vehicle. The vehicle may include the radar system according to any implementation of the second aspect or the third aspect. In a specific implementation, the vehicle may be an autonomous vehicle or a semi-autonomous vehicle.

According to a fifth aspect, an embodiment of this application further provides an aircraft. The aircraft may include the radar system according to any implementation of the second aspect or the third aspect. In a specific implementation, the aircraft may be a drone or another aircraft.

According to a sixth aspect, an embodiment of this application further provides a robot. The robot may include the radar system according to any implementation of the second aspect or the third aspect.

BRIEF DESCRIPTION OF DRAWINGS

FIG. 5A is a schematic flowchart of a signal processing method according to an embodiment of this application;

FIG. 5B is a schematic flowchart of measuring a parameter of a target based on echo signals according to an embodiment of this application;

FIG. 7A is a schematic flowchart of an implementation method for recovering a second Doppler frequency of a first distance-Doppler unit according to an embodiment of this application;

FIG. 8B is a schematic flowchart of a method for determining a distance-Doppler unit in which a target is located according to an embodiment of this application;

FIG. 8C is a schematic diagram of determining a distance-Doppler unit in which a target is located according to an embodiment of this application:

DESCRIPTION OF EMBODIMENTS

The following describes related concepts in the embodiments of this application.

In this specification, coherent superposition (Coherent combination detection) indicates weighted summation of a plurality of pieces of data, or summation of a plurality of signals.

Incoherent superposition (Noncoherent combination detection) indicates addition performed after a modulo operation and a square operation performed on a plurality of pieces of data.

Interleaving implements randomness for encoding, and makes code random and uniform. The interleaving includes regular interleaving, irregular interleaving, random interleaving, prime interleaving, and the like. The random interleaving requires that a distance between each number and a preceding number in a generated sequence is greater than L and L is a positive integer.

A distance-Doppler graph and a distance-velocity graph can be converted to each other. In this specification, the distance-Doppler graph may also be replaced with the distance-velocity graph.

Multiple-input multi-output (MIMO) is an important method for increasing an antenna aperture and implementing high resolution. A MIMO radar can use a plurality of antennas at a transmit end to separately and independently send signals; and use a plurality of antennas to simultaneously receive echo signals, and output the echo signals through a plurality of receivers, to obtain a plurality of channels of spatial sampling signals.

Figure 1A:
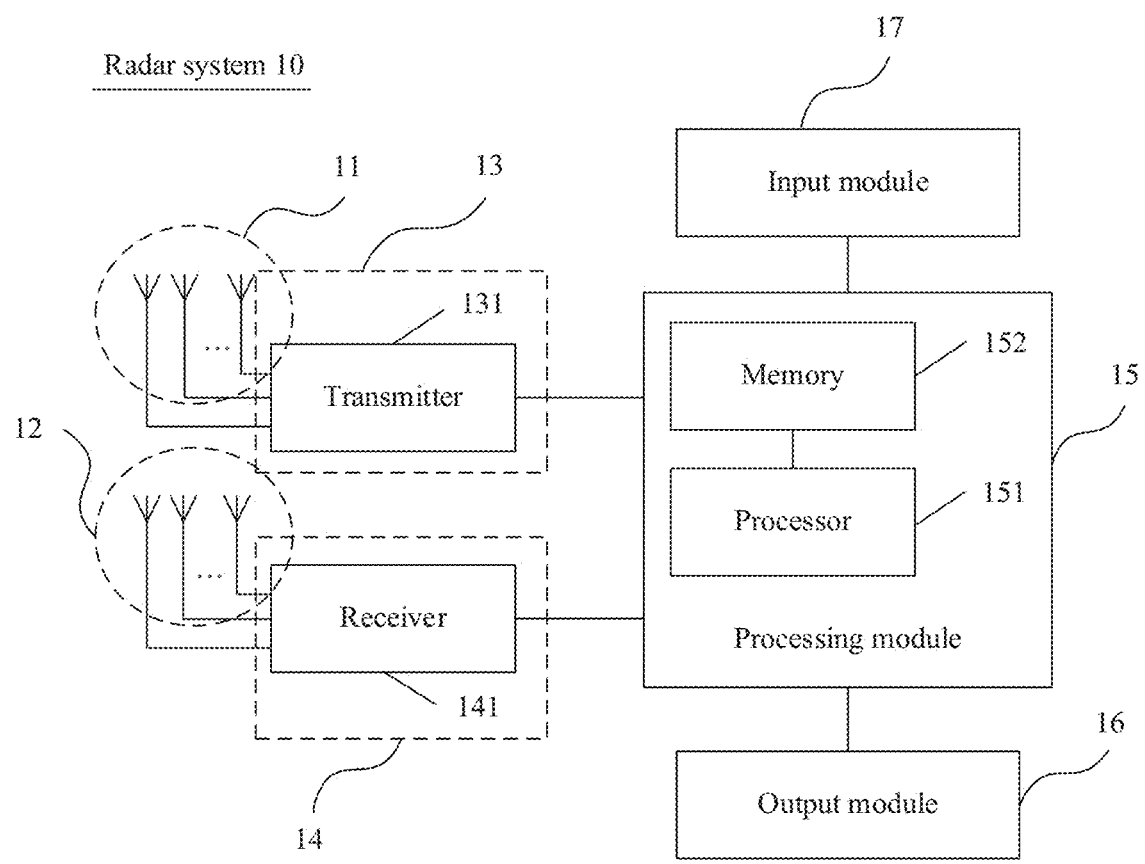
FIG. 1A is a schematic architectural diagram of a radar system according to an embodiment of this application.
Figure 1B:
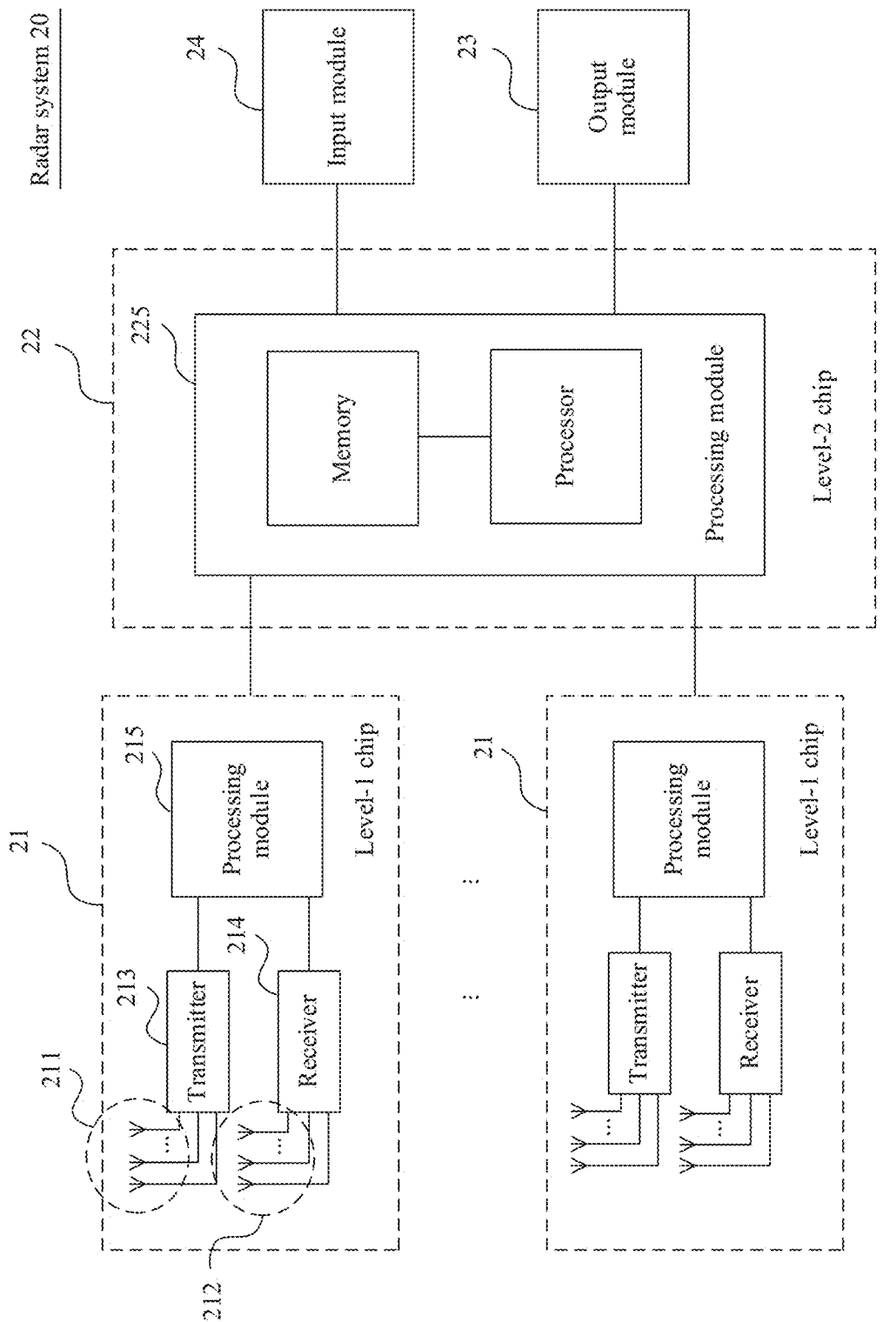
FIG. 1B is a schematic architectural diagram of another radar system according to an embodiment of this application.

With reference to FIG. 1A and FIG. 1B, the following describes a radar system 10 according to an embodiment of this application.

As shown in FIG. 1A, the radar system may include at least M transmit antennas 11, at least N receive antennas 12, a transmitting module 13 coupled to the at least M transmit antennas 11, a receiving module 14 coupled to the at least N receive antennas 12, and at least one processing module 15.

The processing module 15 is configured to process received echo signals, to obtain a parameter of a target. For details, refer to a related description in the following method embodiment. Details are not described herein. The processing module 15 may be further configured to: generate a first transmission sequence, control a transmitter or a receiver, and the like. The processing module 15 may include at least one processor 151 and at least one memory 152.

The transmitting module 13 is configured to transmit a signal under control of the processing module 15 through the transmit antenna 11 coupled to the transmitting module 13. It should be understood that the transmitting module 13 may include at least one transmitter, one transmitter may be coupled to one or more transmit antennas 11, and the transmitting module 13 may select, based on a control signal of the processing module 15, an antenna to transmit a signal.

The receiving module 14 is configured to receive the echo signals through the receive antennas 12 coupled to the receiving module 14. The receiving module 14 may include at least one receiver. One receiver may be coupled to one or more receive antennas 12.

Optionally, the radar system 10 may further include an output module 16, configured to output a processing result of the echo signals. The output module 16 may include but is not limited to an image output module (for example, a display), a voice output module, and the like.

Optionally, the radar system 10 may further include an input module 17, configured to implement information exchange between the radar system and a user. The input module 17 includes but is not limited to a touch panel, a keyboard, a mouse, a voice input module (for example, a microphone), and the like.

The transmitting module 13 and the receiving module 14 may be integrated into a radio frequency chip, or one or more transmitters in the transmitting module 13 and one or more receivers in the receiving module 14 may be integrated into one radio frequency chip.

The processing module 15 may include the processor 151 and the memory 152. The memory 152 is configured to store data and an instruction, for example, in this embodiment of this application, M*N distance-Doppler graphs, an angular spectrum, time numbers of the M transmit antennas arranged based on spatial locations, program code used to implement a method in which an array antenna transmits a signal in an embodiment of this application, and program code used to implement a signal processing method in an embodiment of this application. This is not limited. The processor 151 is configured to invoke the data and the instruction stored in the memory 152 to implement a signal transmitting method and a signal processing method in the following.

As shown in FIG. 1B, in another embodiment of this application, components or modules in a radar system 20 may be integrated in one or more levels of chips. Specifically, the radar system 20 may include a plurality of level 1 chips 21 and at least one level 2 chip 22. For each level 1 chip 21, the level 1 chip 21 may include or couple one or more transmit antennas 211 and one or more receive antennas 212; and may further include a transmitter 213 coupled to the one or more transmit antennas 211, a receiver 214 coupled to the one or more receive antennas 212, and the like. The level 2 chip 22 may include a processing module 225. Optionally, the radar system 20 may further include an output module 23, an input module 24, and the like. For functions of the components or modules, refer to the description of FIG. 1A. Details are not described herein again.

Optionally, the level 1 chip 21 may be a radio frequency chip including at least one receiver 214 and at least one transmitter 213. The level 1 chip 21 may also include a processing module 215. The level 1 chip 21 may choose to process a received echo signal by using the processing module 215 disposed in the level 1 chip 21, or may transmit a received echo signal to the level 2 chip 22 and choose to process the echo signal by using the level 2 chip 22.

It should be noted that the processing module in the level 1 chip or the level 2 chip may include at least one processor and at least one memory. The memory is configured to store data and an instruction. The processing module may be configured to: control each component in the radar system, and invoke the data and the instruction stored in the memory to perform the signal transmitting method and the signal processing method described in the embodiments of this application. For details, refer to descriptions in the following method embodiment. Details are not described herein.

It should be understood that the processing module in FIG. 1A or FIG. 1B may further include another function unit, for example, a frequency mixer or a digital-to-analog conversion module. In another embodiment of this application, a frequency mixer and/or a digital-to-analog conversion module or the like may be alternatively disposed in a radio frequency chip, a transmitting module, a receiving module, a transmitter, and/or a receiver. This is not limited in this embodiment of this application.

It should also be understood that the memory in FIG. 1A or FIG. 1B may be a read-only memory (ROM), a static storage device, a dynamic storage device, or a random access memory (RAM). The processor may be a general purpose central processing unit (CPU), a microprocessor, an application-specific integrated circuit (ASIC), a graphics processing unit (GPU), or one or more integrated circuits. The processor is configured to execute a related program, to implement functions that need to be implemented by the processing module in the embodiments of this application, or perform the signal processing method in the method embodiment of this application.

The processor may be an integrated circuit chip and has a signal processing capability. In an implementation process, steps of the signal processing method in this application may be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor described above may implement or perform methods, steps, and logical block diagrams that are disclosed in the embodiments of this application. The general-purpose processor may be a microprocessor, or the processor may be any conventional processor or the like. A software module may be located in a mature storage medium in the art, such as a random access memory, a flash memory, a read-only memory, a programmable read-only memory, an electrically erasable programmable memory, or a register. The storage medium is located in the memory. The processor reads information in the memory; and completes, in combination with the hardware of the processor, the functions that need to be implemented by the processing module in the embodiments of this application, or performs the signal processing method in the method embodiment of this application.

It should be noted that the radar system may be applied to a vehicle, an aircraft, a robot, or the like, for example, an autonomous vehicle or a semi-autonomous vehicle, an unmanned aircraft, or a drone; may be further applied to a terminal device, for example, a smartphone, a tablet computer, or a wearable device; and may be further applied to a roadside unit (RSU) to detect a velocity, a location, and the like of a vehicle on a road. The roadside unit may include but is not limited to a velocity measurement meter, a photographing apparatus, an indicator light, or the like. This is not limited.

The following describes a method in which an array antenna transmits a signal according to an embodiment of this application.

Generally, in a time-division mode, a phase of a virtual receive antenna in a virtual MIMO array is a sum of a phase of an array response of a target and a Doppler phase shift of a transmit antenna. The phase of the array response is jointly determined based on spatial locations of the target, an entity transmit antenna, and an entity receive antenna. A Doppler phase shift between virtual MIMO subarrays corresponding to transmit antennas is determined based on a switching order of the transmit antennas. If switching is continuously performed on the transmit antennas in an order of spatial locations of the transmit antennas, strong coupling exists between a Doppler phase shift and a phase of an array response. As a result, the same target appears at a plurality of velocities and angles. An embodiment of this application provides a method in which an array antenna transmits a signal. Correlation between space and a Doppler phase shift is reduced by changing a switching order of transmit antennas in the array antenna. In this way, an actual velocity (a velocity before aliasing) of a target can be recovered, to recover a velocity measurement range to a velocity measurement range before aliasing.

Figures 2, 3A:
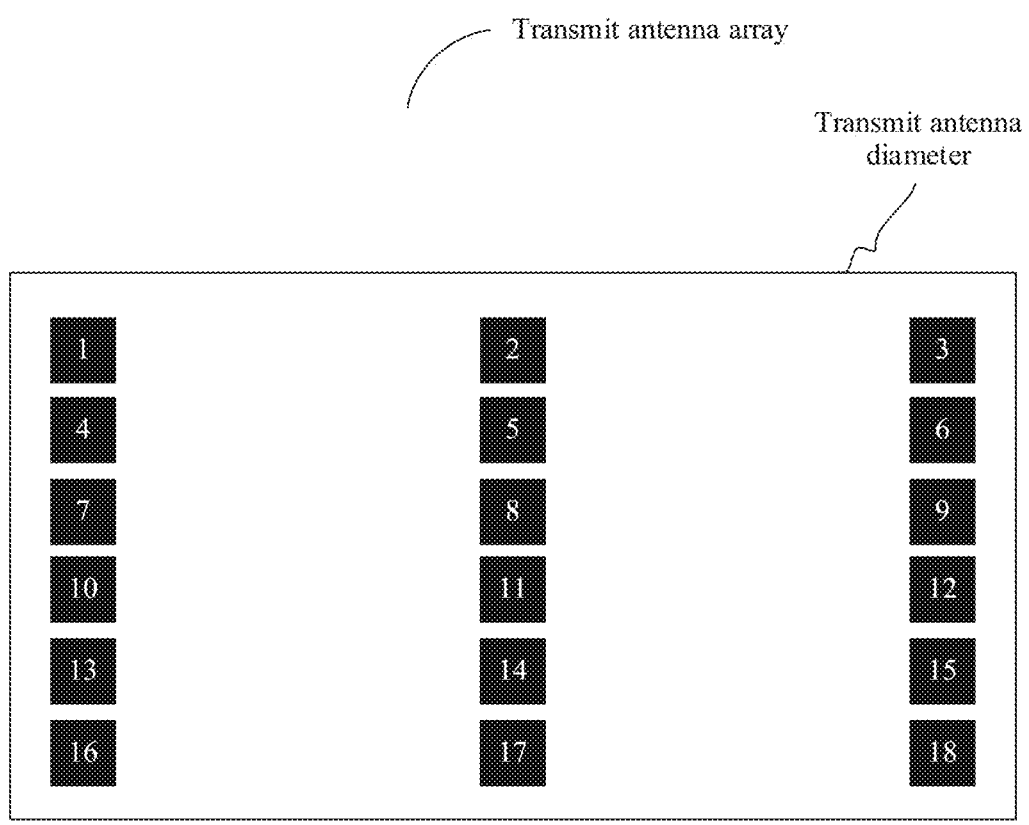
FIG. 2 is a schematic flowchart of a method in which an array antenna transmits a signal according to an embodiment of this application.
FIG. 3A is a schematic diagram of a transmit antenna array according to an embodiment of this application.

FIG. 2 shows a method in which an array antenna transmits a signal. The method may be performed by the processing module 15 in the radar system 10, the processing module 225 in the level 2 chip in the radar system 20, or the processing module 25 in the level 1 chip. This embodiment of this application is described by using a radar system as an example. The method includes but is not limited to all or some of the following steps:

Step S22: Generate a first transmission sequence. The first transmission sequence is different from a sequence that is formed by arranging M transmit antennas based on spatial locations. M is a positive integer greater than 2.

The transmission sequence indicates the M transmit antennas that are arranged in a time order of transmitting signals. It should be understood that, a first transmit antenna in the transmission sequence transmits a signal in a first period for the first time in a round of a signal transmission process, and likewise, an $x^{th}$ transmit antenna in the transmission sequence transmits a signal in an $x^{th}$ period in a round of a signal transmission process. It should be understood that, for the first transmission sequence in this embodiment of the present application, the $x^{th}$ transmit antenna is not necessarily equal to a transmit antenna $T_x$. "x" in the transmit antenna $T_x$ indicates a number of a transmit antenna in an order of spatial locations, and is used to identify a transmit antenna and determine a spatial location of the transmit antenna. The $x^{th}$ transmit antenna is used to indicate a transmit antenna at an $x^{th}$ location in the transmission sequence. "x" indicates that the $x^{th}$ transmit antenna transmits a signal in an $x^{th}$ period in a round of a signal transmission process. It should be further understood that, for the sequence that is formed by arranging the M transmit antennas based on the spatial locations in the prior art, the $x^{th}$ transmit antenna in the sequence formed based on the spatial locations is the transmit antenna $T_x$, and transmits the signal in the $x^{th}$ period in the round of a signal transmission process. x is a positive integer less than M.

It should be understood that spatial locations of any two adjacent transmit antennas in the sequence that is formed by arranging the M transmit antennas based on the spatial locations are also adjacent. It should be further understood that in this embodiment of this application, a process in which the M transmit antennas each transmit a signal in a period is a round. A plurality of rounds of signals may be transmitted.

Optionally, the M transmit antennas are M physical antennas, or the M transmit antennas are obtained by multiplexing at least one of P physical antennas. It may be understood that the first transmission sequence is the sequence including the M physical antennas, or a sequence that is formed by repeating one or more of the P physical antennas for one or more times. P is a positive integer, and $3 \leq P \leq M$. It should be understood that one or more of the P transmit antennas may be used for one or more times in a round of a signal transmission process, that is, the P physical antennas complete signal transmission for M periods in a round of a signal transmission process. Further, signals of two adjacent periods may be transmitted by two non-adjacent transmit antennas in the P physical antennas.

FIG. 3A shows a transmit antenna array. The transmit antenna array may include M (in FIG. 3A, M=18) physical antennas. A combination of the M physical antennas is an aperture of the transmit antennas. The M physical antennas may be arranged based on spatial locations, that is, sequentially arranged from left to right and from top to bottom, to form a transmit antenna array with six rows and three columns. A number is used to distinguish between the transmit antennas.

Figure 3B:
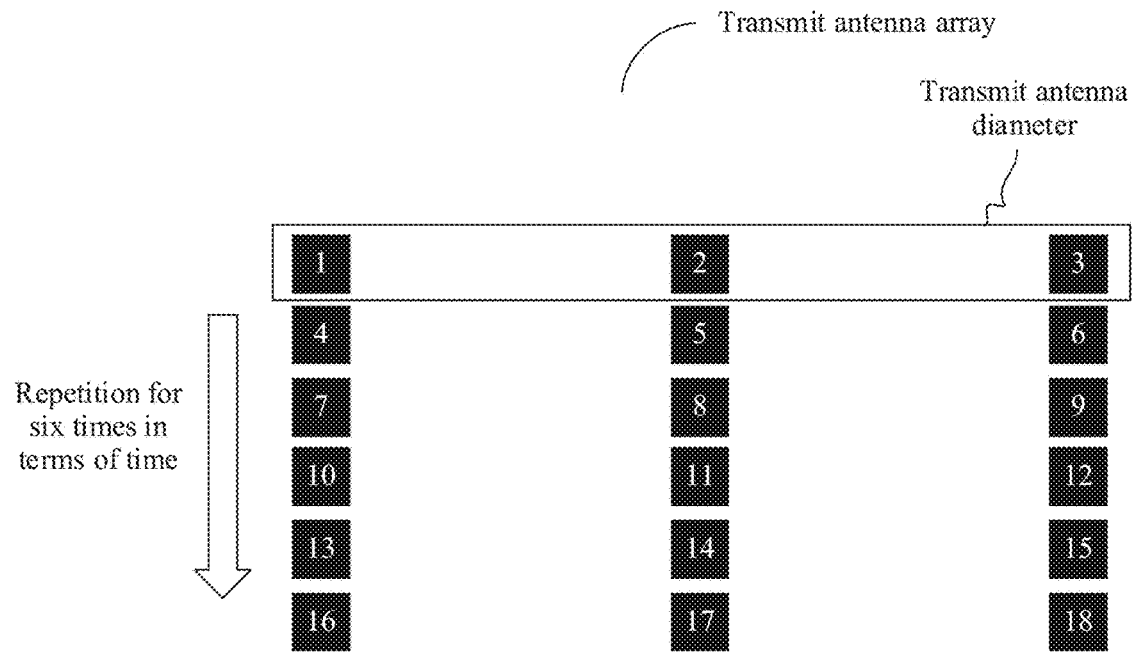
FIG. 3B is a schematic diagram of another transmit antenna array according to an embodiment of this application.

FIG. 3B shows a transmit antenna array. An aperture of transmit antennas is three entity transmit antennas. For P (in FIG. 3B, P=3) physical antennas, the three physical antennas may be repeatedly used for five times. It should be understood that, in a round of a signal transmission process, the same physical antenna is considered as different transmit antennas if the same physical antenna transmits signals at different times.

In this embodiment of the present application, the first transmission sequence is a sequence that is obtained by transforming arrangement of at least two transmit antennas in the sequence that is formed by arranging the M transmit antennas based on the spatial locations. Specifically, the radar system may perform interleaving processing on the sequence that is formed by arranging the M transmit antennas based on the spatial locations. The interleaved sequence of the M transmit antennas is the first transmission sequence.

Optionally, any two adjacent transmit antennas in the sequence that is formed by arranging the M transmit antennas based on the spatial locations are not adjacent in the first transmission sequence. This reduces correlation between space and a Doppler phase shift.

In a specific implementation, the radar system may sequentially number the M transmit antennas arranged based on the spatial locations. As shown in FIG. 3A and FIG. 3B, numbers of the M transmit antennas form a first vector V in M dimensions. Further, elements in the first vector are interleaved to obtain a second vector V. An antenna number is used to identify a transmit antenna. The first vector V includes a sequence that includes numbers of the M transmit antennas arranged based on the spatial locations. An $x^{th}$ element in the second vector V indicates that a transmit antenna whose number is a value of the $x^{th}$ element transmits a signal in an $x^{th}$ period in a round of signal transmission. $1 \geq x \geq M$.

Optionally, in comparison with the first vector V, at least two adjacent elements in the interleaved second vector V' are not adjacent in the first vector V. It should be further understood that numbers in the first vector V may sequentially increase from 0, 1, or another value. This is not limited in this embodiment of this application. In this embodiment of this application, an example in which the M transmit antennas are sequentially positive integers from 1 to M is used for description.

For example, in FIG. 3A and FIG. 3B, the M transmit antennas are sequentially numbered based on the spatial locations, to obtain:

The first vector $V=[1, 2, 3, 4, 5, 6, 7, 8, 9, 10, 11, 12, 13, 14, 15, 16, 17, 18]^T$. A number of an $x^{th}$ element in the first vector V is used to indicate an $x^{th}$ transmit antenna in the M transmit antennas arranged based on the spatial locations.

In this case, time numbers of sequentially transmitting signals by the M transmit antennas arranged based on the spatial locations in a round of a signal transmission process are as follows:

D=[0, 1, 2, 3, 4, 5, 6, 7, 8, 9, 10, 11, 12, 13, 14, 15, 16, 17]$^T$

Random interleaving is performed on the elements in the first vector V to obtain:

the second vector V'=[10, 5, 11, 7, 15, 8, 9, 13, 18, 4, 16, 14, 17, 1, 6, 12, 3, 2]$^T$.

The second vector V' indicates the first transmission sequence. The value of the $x^{th}$ element in the second vector V represents that a transmit antenna whose number is the value of the $x^{th}$ element transmits a signal in the $x^{th}$ period.

In this case, time numbers of sequentially transmitting signals by the M transmit antennas arranged based on the spatial locations in a round of a signal transmission process are as follows:

D'=[13, 17, 16, 9, 1, 14, 3, 5, 6, 0, 2, 15, 7, 11, 14, 10, 12, 8]$^T$

A time number of each transmit antenna may be used for Doppler phase compensation performed on a signal by a receive end. For details, refer to the following description in the embodiment of the signal processing method. Details are not described herein.

It should be understood that, in another embodiment of this application, D may be alternatively interleaved to obtain D', and the interleaved first transmission sequence V of the M transmit antennas may be further determined.

It should be understood that the interleaving includes prime interleaving, random interleaving, regular interleaving, irregular interleaving, or the like. This is not limited. In another embodiment of this application, the first transmission sequence may be alternatively generated in another manner. This is not limited.

Step S24: Control the M transmit antennas to sequentially transmit signals according to the first transmission sequence.

Figure 4A:
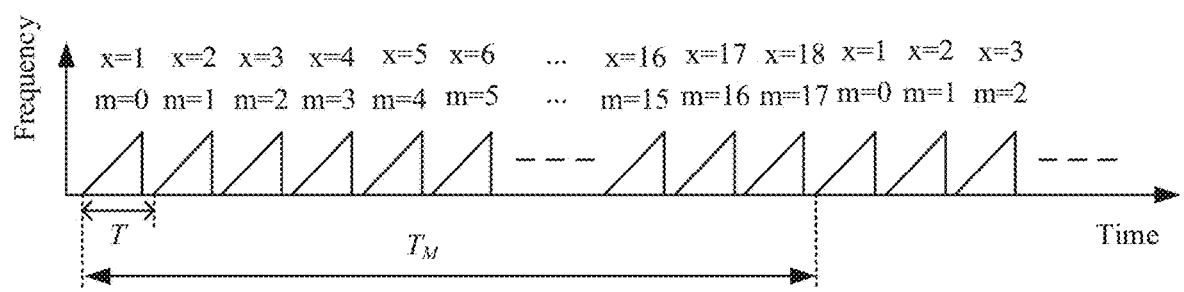
FIG. 4A is a schematic diagram of transmitting signals according to a sequence formed through arrangement based on spatial locations in the prior art.

FIG. 4A is a schematic diagram of transmitting signals according to a sequence formed by arranging the transmit antennas shown in FIG. 3A or FIG. 3B based on spatial locations in the prior art. In the prior art, switching is performed according to a sequence of the spatial locations of the M transmit antennas. x is a number of a transmit antenna in a spatial location order, and m is a time number of a transmit antenna.

Figure 4B:
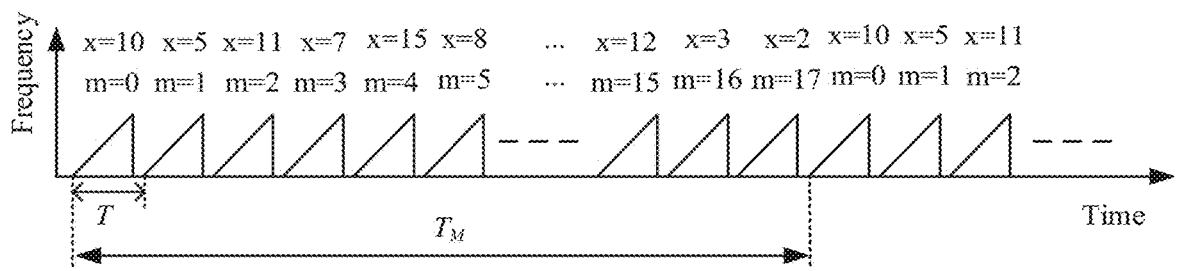
FIG. 4B is a schematic diagram of transmitting signals according to a first transmission sequence according to an embodiment of this application.

FIG. 4B is a schematic diagram of transmitting signals by the transmit antennas shown in FIG. 3A or FIG. 3B according to a first transmission sequence according to an embodiment of this application.

It may be understood that after a transmission order is determined, a time number corresponding to each transmit antenna may be determined according to the transmission order.

Optionally, one transmit antenna may include one or more transmit sub-antennas that transmit the same waveform or different waveforms, and the one or more transmit sub-antennas may correspond to one transmit channel. The one or more transmit sub-antennas that transmit the same waveform may implement beamforming. Code division may be implemented for one or more transmit sub-antennas that transmit different waveforms. After decoding, the sub-transmit antennas in code division can independently form a radar system in which time division multiplexing is implemented.

It should be noted that the signal transmitting method in this embodiment of this application may be applied to the radar system in which time division multiplexing is implemented. Only one transmit antenna works each time. All receive antennas can receive an echo signal corresponding to a transmitted signal. It may be understood that one transmit antenna may transmit a signal in one period, and all the transmit antennas transmit the same waveform.

It may be learned that, in the method in which an array antenna transmits a signal and that is provided in this embodiment of this application, correlation between space and a Doppler phase shift is reduced by changing a switching order of transmit antennas in the array antenna. In this way, the receive end can recover an actual velocity of a target, to recover a velocity measurement range to a velocity measurement range before aliasing.

With reference to FIG. 5A and FIG. 5B, the following describes a signal processing method according to an embodiment of this application.

In this embodiment of this application, M transmit antennas are controlled to transmit a specified radar waveform according to a specific transmission sequence (for example, the first transmission sequence in the foregoing method in which an array antenna transmits a signal), N receive antennas are controlled to simultaneously receive a radar echo. In this embodiment of this application, a parameter (for example, a distance, a velocity, or an angle) of a target is measured based on data received from M*N receive channels (that is, M*N virtual receive antennas). It should be understood that, in this embodiment of this application, switching is performed on the M transmit antennas in turns to transmit the same radar waveform. One transmit antenna works each time. The N receive antennas receive the same radar waveform.

Figure 6A:
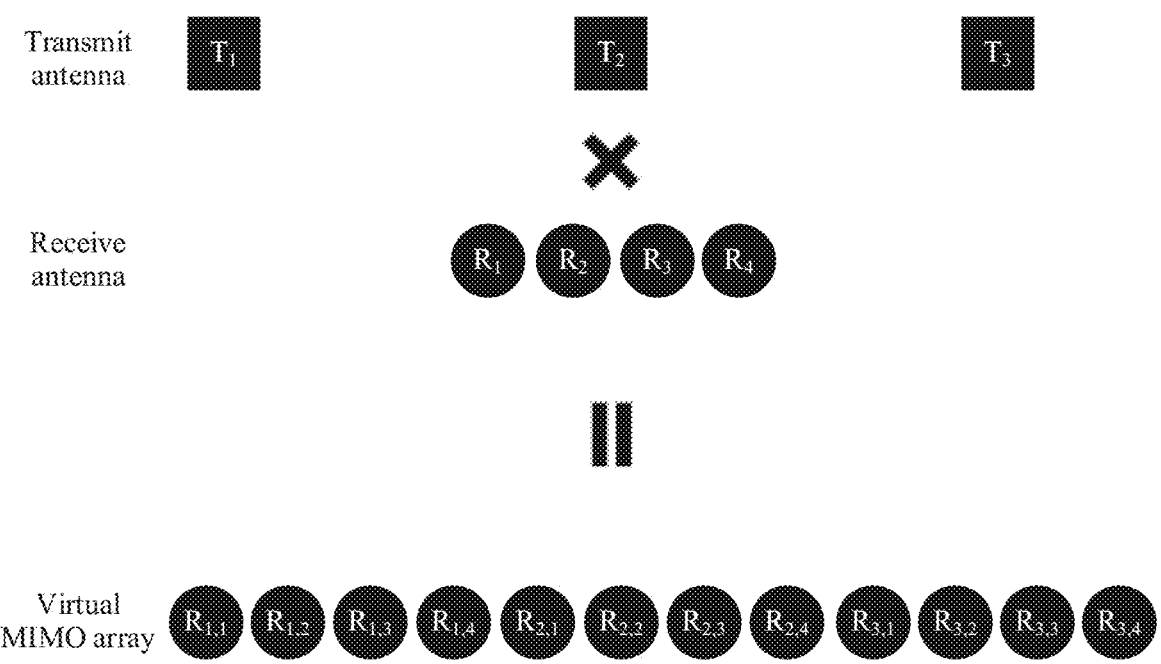
FIG. 6A is a schematic diagram of a virtual MIMO array according to an embodiment of this application.

In this embodiment of this application, M=3 and N=4 are used as examples for description. It should be understood that different antenna transmission/reception locations correspond to different apertures of virtual antennas and different antenna aperture extension. FIG. 6A shows a virtual MIMO array combining three transmit antennas ($T_1$, $T_2$, and $T_3$) and four receive antennas ($R_1$, $R_2$, $R_3$, and $R_4$). The virtual MIMO array includes 12 virtual receive antennas ($R_{1,1}$, $R_{2,1}$, $R_{3,1}$, $R_{4,1}$, $R_{1,2}$, $R_{2,2}$, $R_{3,2}$, $R_{4,2}$, $R_{1,3}$, $R_{2,3}$, $R_{3,3}$, and $R_{4,3}$). $R_{x,y}$ is a virtual receive antenna corresponding to the receive antenna $R_y$ receiving an echo signal corresponding to a signal transmitted by a transmit antenna $T_x$, x is an index of the transmit antenna, y is an index of the receive antenna, x and y are positive integers, $1 \leq y < N$, and $1 \leq x < M$.

Figure 6B:
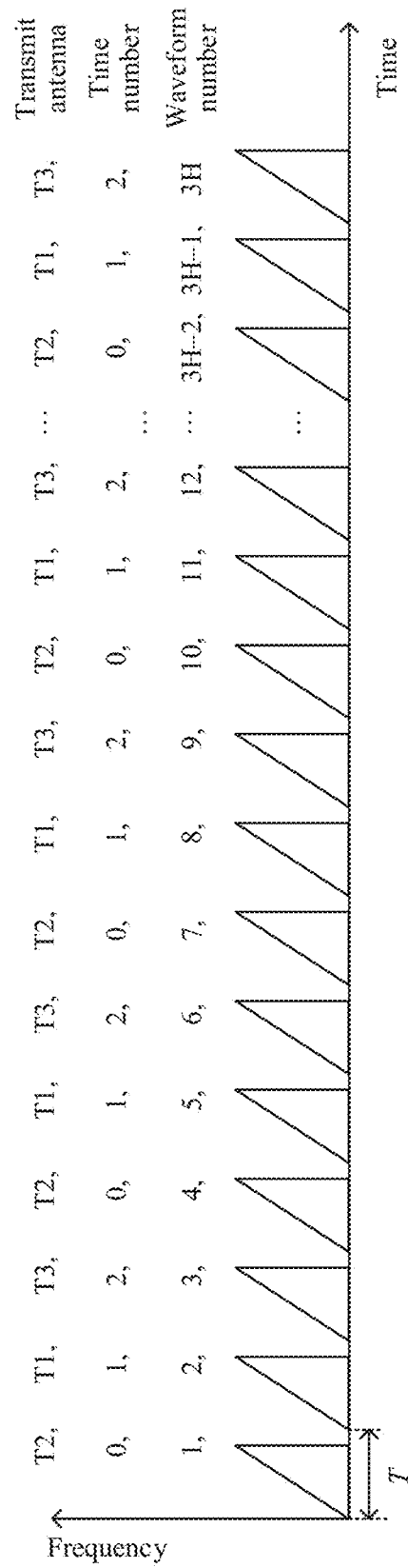
FIG. 6B is a schematic diagram of transmitted signals that are transmitted by three transmit antennas in different times according to an embodiment of this application.

FIG. 6B is a schematic diagram of transmitted signals that are transmitted by three transmit antennas in different times. In FIG. 6B, switching is performed on the three transmit antennas according to a switching order ($T_2$, $T_1$, and $T_3$). Each transmit antenna transmits the same waveform. An obtained signal transmission period is T. Each transmit antenna transmits a signal in one period to complete one round of signal transmission, that is, M*T. The transmit antennas may transmit signals of H rounds of signal transmission, to obtain the transmitted signals shown in FIG. 6B. As shown in FIG. 6B, a time number of a transmit antenna $T_1$ is 1, a time number of a transmit antenna $T_2$ is 0, and a time number of a transmit antenna $T_3$ is 2. It should be understood that, for a specific transmit antenna, a signal transmission period of the transmit antenna is M*T. To distinguish between signals transmitted by different transmit antennas in different time periods, a signal in each time period is described by using a waveform number. In this specification, H is a positive integer greater than or equal to 2.

In this embodiment of this application, a virtual receive antenna may also be referred to as a "receive channel". The radar system may divide, into data received by the M virtual receive antennas, data received by one receive antenna at different times.

The signal processing method in this embodiment of this application may be performed by the radar system 10, or the level 2 chip or the level 1 chip in the radar system 20. This embodiment of this application is described by using an example in which an execution device is a radar system. The signal processing method may include but is not limited to some or all of the following steps:

Step S2: Sequentially transmit signals according to a first transmission sequence through M transmit antennas. The first transmission sequence is different from a sequence that is formed by arranging the M transmit antennas based on spatial locations. M is a positive integer greater than 2.

Step S4: Receive, through N receive antennas, echo signals that are formed after a target reflects the transmitted signals. N is a positive integer.

Step S6: Measure a parameter of the target based on the echo signals.

It should be understood that for the radar system in which time division multiplexing is implemented, only one transmit antenna works each time, and the N receive antennas receive an echo signal corresponding to a transmitted signal of the working transmit antenna. In this embodiment of this application, as shown in FIG. 6B, the M transmitted signals may be transmitted in the same waveform.

In an embodiment of this application, a predicted transmission sequence of the M transmit antennas may be a transmission sequence generated in the foregoing method in which an array antenna transmits a signal. For details, refer to the descriptions in the foregoing embodiments. Details are not described again in this embodiment of this application. In another embodiment of this application, the first transmission sequence may be alternatively the sequence of the M transmit antennas arranged based on the spatial locations. This embodiment of this application is described by using the virtual MIMO array shown in FIG. 6A, and the first transmission sequence ($T_2$, $T_1$, and $T_3$) and the transmitted waveform shown in FIG. 6B as examples.

FIG. 5B is a schematic flowchart of measuring a parameter of a target based on echo signals according to an embodiment of this application. An implementation method of step S6 may include but is not limited to some or all of the following steps:

Step S62: Calculate, based on the echo signals, a distance-Doppler graph corresponding to each virtual receive antenna, to obtain M*N distance-Doppler graphs. The virtual receive antenna is an array element in a virtual MIMO array including M transmit antennas and N receive antennas. The distance-Doppler graph is divided into a plurality of distance-Doppler units arranged in an array.

It should be understood that the virtual MIMO array obtained by combining the M transmit antennas and the N receive antennas includes M*N virtual receive antennas. The radar system may divide echo signals received by each of the N receive antennas into echo signals received by the M virtual receive antennas, to obtain data received by the M*N virtual receive antennas. The echo signals received by the virtual receive antenna are used to generate a distance-Doppler graph corresponding to the virtual receive antenna.

In this embodiment of this application, a virtual antenna $R_{x,y}$ is used as an example to describe a method for calculating a distance-Doppler graph corresponding to each virtual receive antenna in the virtual MIMO array. It is assumed that the M transmit antennas each transmit H rounds of signals. Specifically, a method for calculating a distance-Doppler graph corresponding to the virtual receive antenna $R_{x,y}$ may include the following:

Corresponding to an $h^{th}$ round of a signal transmission period, an echo signal that corresponds to a signal transmitted by a transmit antenna $T_x$ and that is received by a receive antenna $R_y$ (that is, an echo signal received by the virtual receive antennas $R_{x,y}$ in a first round) is $G_{x,y}(h,t)$. After processing such as filtering and amplification is performed on the echo signal, sampling is performed on the processed echo signal $G_{x,y}(h,t)$ based on a preset sampling rate, to obtain K discrete digital signals $G_{x,y}(h,k)$. $1 \leq k \leq K$. The K digital signals may be represented as $G_{x,y}(h)$. k is an index of a sampling point obtained through sampling at a preset sampling rate, h and k are positive integers, $1 \leq h \leq H$ and $1 \leq k \leq K$.

Likewise, the radar system may separately perform processing processes such as filtering, amplification, and sampling on an echo signal received by the virtual receive antenna $R_{x,y}$ in each round, to obtain K digital signals corresponding to the echo signal received by the virtual receive antenna $R_{x,y}$ in each round, that is, [$G_{x,y}(1)$, $G_{x,y}(2)$, ..., $G_{x,y}(h)$, ..., $G_{x,y}(H)$]. The K digital signals $G_{x,y}(h)$ respectively corresponding to the echo signal received by the virtual receive antenna $R_{x,y}$ in an $h^{th}$ round may be represented as [$G_{x,y}(h,1)$, $G_{x,y}(h,2)$, ..., $G_{x,y}(h,k)$, ..., $G_{x,y}(h,K)$].

An FMCW waveform is used as an example. A sweep waveform is transmitted through a transmit channel. A time delay exists between echo signals of targets at different distances. At a receive channel, down mixing is performed on the transmitted waveform and the echo signal, and the echo signals of the targets at the different distances are converted into simple signals at different frequencies. A relatively close target corresponds to a relatively low frequency, and a relatively distant target corresponds to a relatively high frequency. Because a sweep speed in a waveform is generally relatively large, a frequency generated from the distance of the target is far greater than a Doppler frequency generated from a velocity of the target. Therefore, spectrum transform, for example, fast Fourier transform (FFT) is performed on sampling values of the sequence in the waveform, to obtain frequency information of the distance of the target. Frequency change due to the distance does not occur to corresponding sampling points between waveforms. The corresponding sampling points have only Doppler frequency information brought by the velocity. Therefore, spectrum transform may be performed on sampling values of the sequence between waveforms, to obtain Doppler frequency information of the target.

A specific implementation of generating a distance-Doppler graph based on digital signals of the virtual receive antenna $R_{x,y}$ in H rounds is as follows:

Two-dimensional Fourier transform is performed on K digital signals corresponding to an echo signal received by the virtual receive antenna $R_{x,y}$ in each round of the H rounds. To be specific, Fourier transform is performed for the first time in a k direction on the K digital signals corresponding to the echo signal received by the virtual receive antenna $R_{x,y}$ in each round. Then, Fourier transform is performed for the second time in an h direction on the data obtained after Fourier transform is performed for the first time. It should be understood that a data matrix obtained after the two times of Fourier transform is the distance-Doppler graph corresponding to the virtual receive antenna $R_{x,y}$. The data obtained after the two-dimensional Fourier transform is denoted as $S_{x,y}(r, v)$. r indicates an estimated distance, and v indicates an estimated Doppler frequency or an estimated velocity.

For a frequency modulated continuous wave (FMCW), a relationship between a distance r and a frequency $f_r$ in the distance-Doppler graph is as follows:

$$r = \frac{cf_r}{2\alpha} \quad (1)$$

The frequency $f_r$ is obtained after Fourier transform is performed for the first time. The relationship between a frequency and a distance may be described by using Formula (1).

A frequency f(t) of a linear sweep signal changes over time t.

$$f(t) = f_c + \alpha t$$

α represents a sweep rate (or referred to as a modulation coefficient), and $f_c$ represents a carrier frequency.

A relationship between a velocity v and a (Doppler) frequency $f_D$ represented by a horizontal coordinate in the distance-Doppler graph is as follows:

$$v = \frac{\lambda_c f_D}{2} \quad (2)$$

A distance-Doppler frequency graph and a distance-velocity graph may be converted to each other based on a one-to-one correspondence between the velocity v and the (Doppler) frequency $f_D$. In this embodiment of this application, the distance-Doppler graph may be a distance-Doppler frequency graph or a distance-velocity graph.

Because frequencies after FFT transform are discrete, distances and velocities are also indicated in a discrete manner. Herein, units in the distance-Doppler graph are discrete. Location coordinates indicated by using a distance and a Doppler frequency are used to indicate a distance-Doppler unit.

Figure 6C:
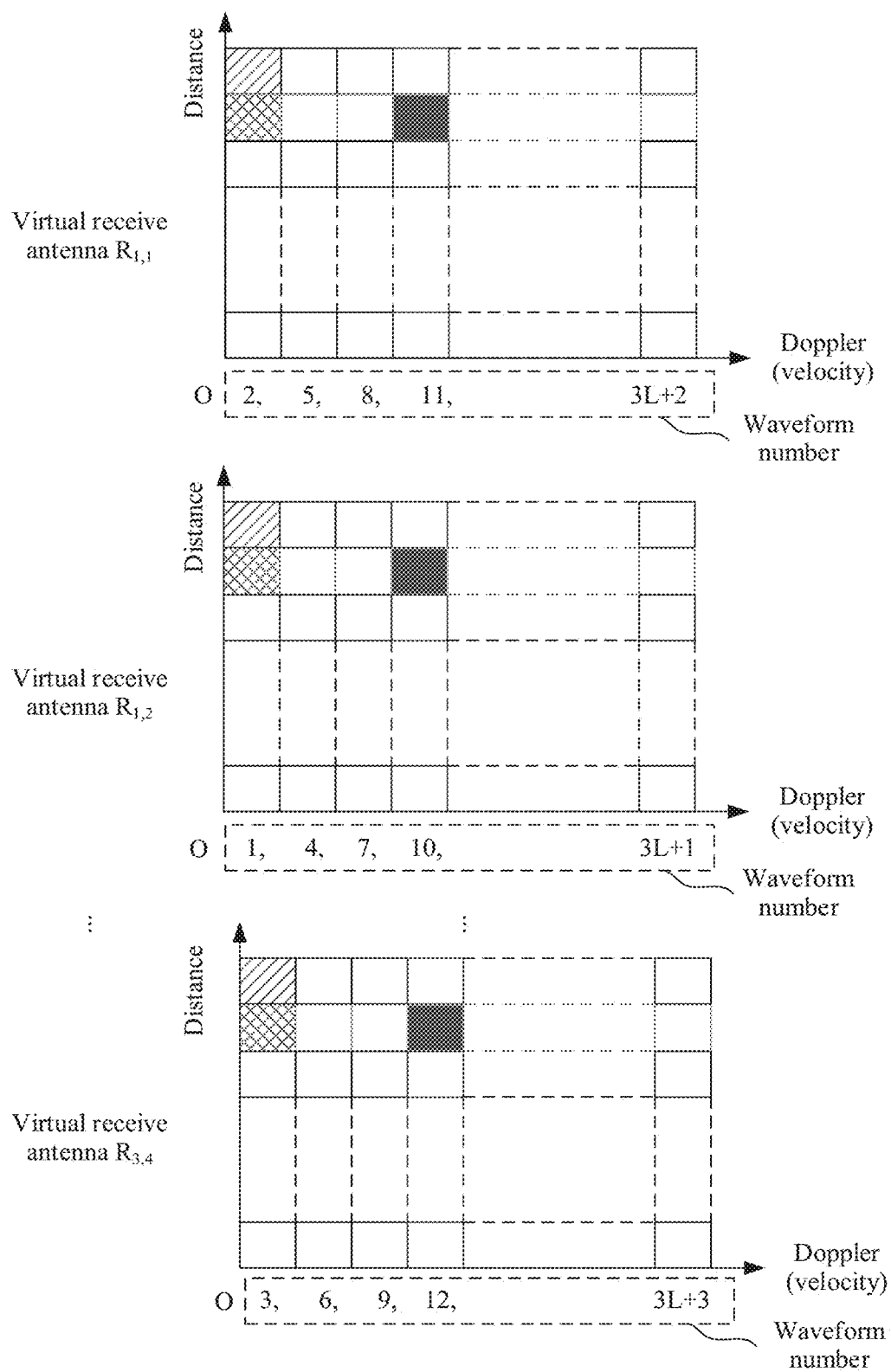
FIG. 6C is a schematic diagram of a distance-Doppler (velocity) graph obtained through calculation according to an embodiment of this application.

FIG. 6C shows distance-Doppler graphs that correspond to 12 virtual receive antennas and that are correspondingly obtained based on the virtual MIMO array shown in FIG. 6A and the transmitted signals shown in FIG. 6B. Each grid represents one distance-Doppler unit.

It may be learned from FIG. 6C that a distance-Doppler graph corresponding to a virtual receive antenna $R_{1,1}$ is generated based on echo signals corresponding to signals (a waveform 2, a waveform 5, a waveform 8, a waveform 11, . . . , and a waveform 3H-1) that are transmitted by a transmit antenna T1 and that are received by a receive antenna R1.

Likewise, a distance-Doppler graph corresponding to a virtual receive antenna $R_{0,1}$ is generated based on echo signals corresponding to signals (a waveform 1, a waveform 4, a waveform 7, a waveform 10, . . . , and a waveform 3H-2) that are transmitted by the transmit antenna T1 and that are received by a receive antenna R0.

It should be noted that this embodiment of this application is described by using an example in which the transmitted signal is an FMCW. The transmitted signal may be alternatively a phase modulated continuous wave (PMCW) or an orthogonal frequency division multiplexing waveform (OFDM), or the like. Principles for obtaining distance-Doppler graphs of different waveforms are different. For details, refer to related descriptions in the prior art. Details are not described herein.

Step S64: Perform Doppler phase compensation for the first time on data of a first distance-Doppler unit in a first distance-Doppler graph by using a first Doppler phase compensation amount that is determined based on an order of the transmit antenna $T_x$ in the first transmission sequence. The first distance-Doppler graph is a distance-Doppler graph corresponding to any virtual receive antenna in a virtual MIMO subarray corresponding to the transmit antenna $T_x$. The transmit antenna $T_x$ is any transmit antenna in the M transmit antennas. The first distance-Doppler unit is a unit that is determined based on a first Doppler frequency and a first distance and that is in the distance-Doppler graph.

In an implementation of this embodiment of this application, the first distance-Doppler unit may be a unit in which a target is located. In other words, before step S56 is performed, the unit in which the target is located may be detected, or the unit in which the target is located may be estimated. Further, compensation is performed on only data of the unit in which the target is located, to reduce a calculation amount for the compensation, thereby improving a response speed of detecting the target by the radar system. For the method for detecting the target, refer to a related description of an implementation (1), (2), or (3) for detecting the target. Details are not described in this embodiment of this application.

In another implementation of this embodiment of this application, the first distance-Doppler unit may be any unit. In other words, the unit in which the target is located is detected after step S56. For the method for detecting the target, refer to a related description of an implementation (1)

or (3) for detecting the target. Details are not described in this embodiment of this application.

It should be understood that, when it is assumed that a second Doppler frequency of the target located in the first distance-Doppler unit (r, v) is $\bar{f}_D$, Doppler frequency obtained after sampling, analysis, and aliasing is as follows:

$$f_{r,v} = \bar{f}_D - 2\xi_{r,v} f_{D,max} \quad (3)$$

$\xi_{r,v}$ represents a second aliasing coefficient, a first Doppler frequency $f_{r,v}$ is a Doppler frequency obtained after aliasing, that is, a Doppler frequency of the first distance-Doppler unit, $-f_{D,max} \leq f_{r,v} < f_{D,max}$, and $$f_{D,max} = \frac{1}{2MT}.$$

The second Doppler frequency $\bar{f}_D$ is a Doppler frequency before aliasing. The second aliasing coefficient is an aliasing coefficient determined in an aliasing coefficient set. The second aliasing coefficient needs to be determined, to obtain the second Doppler frequency $\bar{f}_D$ of the target.

The following is described by using an example in which the first distance-Doppler unit in the distance-Doppler graph corresponding to the virtual receive unit $R_{x,y}$ is (r, v). An implementation method for performing Doppler phase compensation for the first time for the distance-Doppler unit (r, v) is specifically as follows:

$$S'_{x,y}(f_{r,v}) = S_{x,y}(f_{r,v})e^{-j2\pi f_{r,v} mT} = S_{x,y}(f_D)e^{j2\pi \frac{\xi m}{M}} \quad (4)$$

$S_{x,y}'(f_{r,v})$ represents data before the compensation for the first distance-Doppler unit (r, v) in the first distance-Doppler graph, $S_{x,y}'(f_{r,v})$ represents the data obtained after Doppler phase compensation is performed for the first time for the first distance-Doppler unit (r, v) in the first distance-Doppler graph, $e^{-j2\pi f_{r,v} mT}$ represents a first Doppler phase compensation amount of $S_{x,y}(f_{r,v})$, m is a time number of a transmit antenna, and T represents a signal period. T and $f_{r,v}$ are known. It may be learned that the first Doppler phase compensation amount is determined based on the time number m of the transmit antenna. The time number of the transmit antenna is determined based on the first transmission sequence of the M transmit antennas. For the time number of the transmit antenna, refer to the related description in the embodiment of the signal transmitting method. Details are not described herein again.

It should be further understood that one transmit antenna corresponds to one time number. Doppler phase compensation is performed for the first time by using the same time number for a distance-Doppler graph corresponding to any virtual receive antenna in the virtual MIMO subarray corresponding to the transmit antenna $T_x$.

In the foregoing method, Doppler phase compensation may be performed for the first time for all distance-Doppler units in the M*N distance-Doppler graphs.

Step S66: Recover second Doppler frequencies of first distance-Doppler units based on first Doppler frequencies and data that is obtained after Doppler phase compensation is performed for the first time for the first distance-Doppler units in the M*N distance-Doppler graphs.

It may be learned from Formula (3) that, if the second Doppler frequency of the first distance-Doppler unit needs to be recovered, the second aliasing coefficient of the phase compensation of the unit needs to be determined. It should be understood that one unit corresponds to one or more second aliasing coefficients.

Figure 7B:
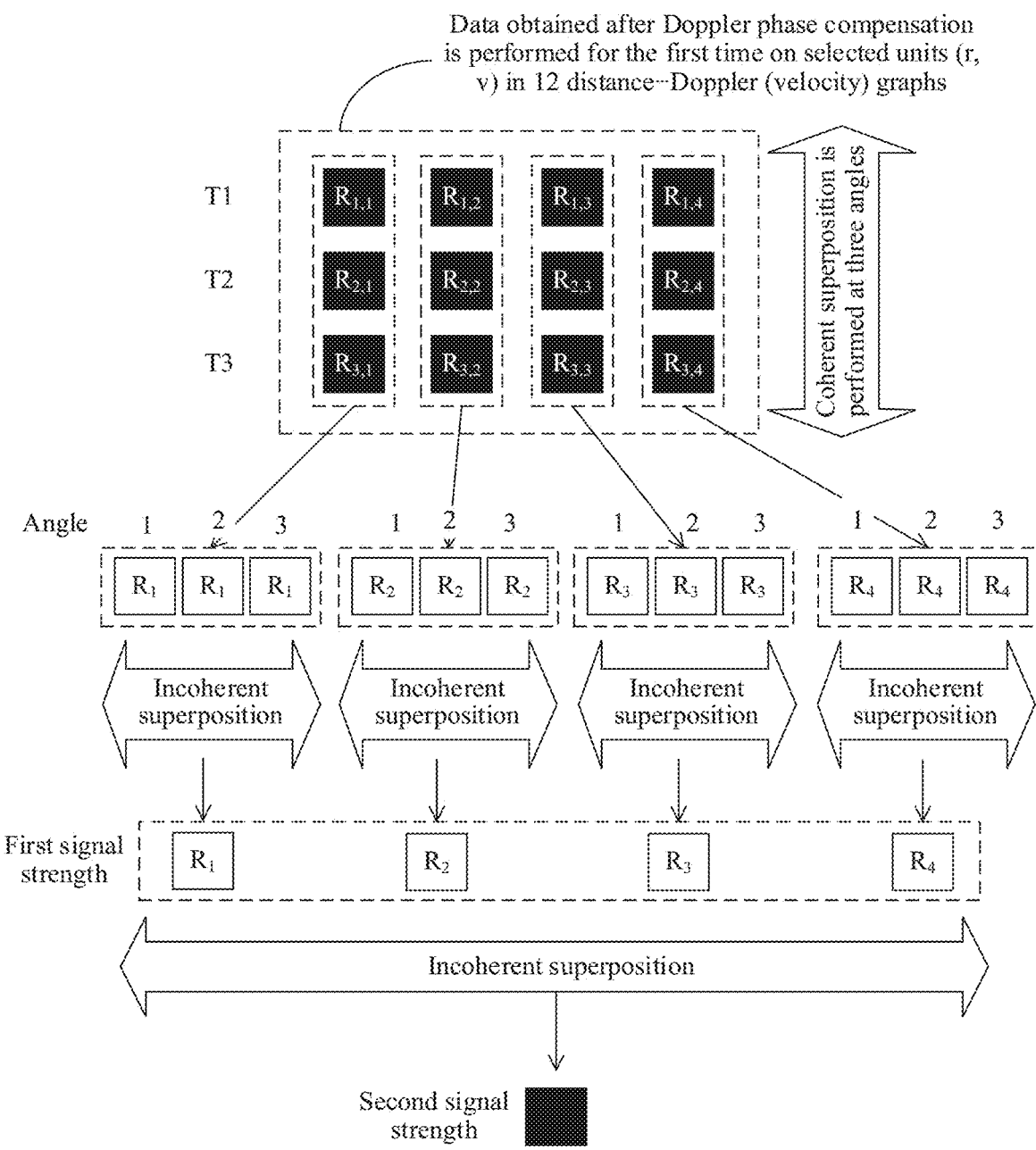
FIG. 7B is a schematic diagram of recovering a second Doppler frequency of a selected distance-Doppler unit according to an embodiment of this application.

This embodiment of this application is described by using the first distance-Doppler unit as an example. An implementation method of recovering the second Doppler frequency of the first distance-Doppler unit may include but is not limited to the following two implementations:

In a first implementation of step S66:

The first implementation method of step S66 is described in the following with reference to a schematic flowchart of an implementation method for recovering the second Doppler frequency of the first distance-Doppler unit shown in FIG. 7A and a schematic diagram of recovering a second Doppler frequency of a selected distance-Doppler unit shown in FIG. 7B. The implementation method may include but is not limited to some or all of the following steps:

FIG. 7B corresponds to the virtual MIMO array shown in FIG. 6A, the transmitted signals shown in FIG. 6B, and the distance-Doppler graphs shown in FIG. 6C. FIG. 7B is described by using an example in which the first distance-Doppler unit is a unit shown in a black grid in FIG. 6C.

Step S6611: Perform, by using a second Doppler phase compensation amount that is determined based on a first aliasing coefficient and the order of the transmit antenna L in the first transmission sequence, Doppler phase compensation for the second time on data obtained after Doppler phase compensation is performed for the first time for the first distance-Doppler unit in the first distance-Doppler graph. The first aliasing coefficient is any aliasing coefficient in an aliasing coefficient set. The aliasing coefficient set includes 0 and a positive integer less than M.

The data obtained after Doppler phase compensation is performed for the second time for the first distance-Doppler unit is recovered to the data of the first distance-Doppler unit before aliasing. The data obtained after Doppler phase compensation is performed for the second time for the first distance-Doppler unit (r, v) in the distance-Doppler graph corresponding to the virtual receive unit $R_{x,y}$ may be represented as follows:

$$S''_{x,y}(f_{r,v}) = S'_{x,y}(f_{r,v})e^{-j2\pi \frac{\xi m}{M}} = S_{x,y}(f_D) \quad (5)$$

$S_{x,y}'(f_{r,v})$ represents the data obtained after Doppler phase compensation is performed for the second time for the first distance-Doppler unit (r, v) in the distance-Doppler graph corresponding to the virtual receive unit $R_{x,y}$, $S_{x,y}'(f_{r,v})$ represents the data obtained after Doppler phase compensation is performed for the first time for the first distance-Doppler unit (r v) in the distance-Doppler graph corresponding to the virtual receive unit $$R_{x,y}, e^{-j2\pi \frac{\xi m}{M}}$$

represents the second Doppler phase compensation amount, and $S_{x,y}(f_D)$ represents the data of the first distance-Doppler unit (r, v) in the distance-Doppler graph corresponding to the virtual receive unit $R_{x,y}$ before aliasing.

It may be learned that the second Doppler phase compensation amount is determined jointly based on the time number m of the transmit antenna and the aliasing coefficient $\xi$. In this embodiment of the present application, a signal strength that is of a selected distance-Doppler unit and that corresponds to each aliasing coefficient ξ is calculated by using the following steps S6611, S6612, and S6613, and an aliasing coefficient that enables a signal strength to meet a first condition is further determined as the second aliasing coefficient, to recover the second Doppler frequency of the selected distance-Doppler unit.

Step S6612: Perform, in at least one angle, coherent superposition on data obtained after Doppler phase compensation is performed for the second time for first distance-Doppler units in M1 distance-Doppler graphs, and perform incoherent superposition on data obtained after the coherent superposition, to obtain first signal strengths. M distance-Doppler graphs include the M1 distance-Doppler graphs, the M distance-Doppler graphs include a distance-Doppler graph corresponding to any virtual receive antenna in a virtual MIMO subarray corresponding to a receive antenna $R_y$, the receive antenna $R_y$ is any receive antenna in the N receive antennas, M1 is a positive integer, and 2≤M1≤M.

In this embodiment of this application, the receive antenna $R_y$ is used as an example for description. The virtual MIMO subarray corresponding to the receive antenna $R_y$ includes virtual receive antennas $R_{1,y}$, $R_{2,y}$, ..., and $R_{M,y}$.

A first angle in a field of view (FoV) of the radar system may be selected. The first angle is any angle of at least one angle. Coherent superposition is performed in the first angle on M1 pieces of data in the data obtained after Doppler phase compensation is performed for the second time for the first distance-Doppler units in the M1 distance-Doppler graphs, that is, in $S_{1,y}''(f_{r,v})$, $S_{2,y}''(f_{r,v})$, ..., and $S_{M,y}''(f_{r,v})$. Likewise, data obtained after coherent superposition of the M1 pieces of data in each angle of the at least one angle may be obtained. Further, incoherent superposition is performed on the data obtained after coherent superposition, to obtain the first signal strengths. The first signal strength is a signal strength of a signal received by the receive antenna Ry in the first distance-Doppler unit.

Likewise, a signal strength of each of N receive antennas in the first distance-Doppler unit may be obtained.

Step S6613: Perform incoherent superposition on first signal strengths respectively corresponding to N1 receive antennas, to obtain second signal strengths. The N receive antennas include the N1 receive antennas, and N1 is a positive integer not greater than N.

It should be understood that the foregoing steps S6612, S6614, and S6618 may be performed based on each aliasing coefficient in the aliasing coefficient set, to obtain a second signal strength corresponding to each aliasing coefficient.

Step S6614: Determine that the second aliasing coefficient is an aliasing coefficient that enables the second signal strength to meet the first condition in the aliasing coefficient set.

Determining the second aliasing coefficient based on the second signal strength may include but is not limited to the following two implementations:

Implementation 1:

The radar system may determine that the second aliasing coefficient is an aliasing coefficient that enables the second signal strength to be greater than a first threshold in the aliasing coefficient set.

The first threshold may be a fixed value, or may be determined based on a second signal strength of a surrounding distance-Doppler unit. For example, the first threshold is an average value of second signal strengths corresponding to surrounding units or 1.5 times of the average value. This is not limited in this embodiment of this application.

Implementation 2:

The radar system may determine that the second aliasing coefficient is an aliasing coefficient that enables the second signal strength to be the largest in the aliasing coefficient set.

It should be noted that the aliasing coefficient set includes M integers, and may be [0, 1, 2 ..., M−1]. It should be understood that, because of periodicity of signals, the aliasing coefficient set may further include another form of representation, for example, an addition/subtraction preset value of each element in the aliasing coefficient set, and/or an increased/reduced multiple of M for one or more elements in the aliasing coefficient set.

For example, when M is an even number, the aliasing coefficient set is [−M/2, −M/2+1, −M/2+2, ..., M/2−1].

For another example, when M is an odd number, the aliasing coefficient set is [−(M−1)/2, −(M−1)/2+1, −(M−1)/2+2, ..., (M−1)/2−1].

Step S6615: Recover the second Doppler frequency of the first distance-Doppler unit based on the second aliasing coefficient and the first Doppler frequency.

Specifically, the second Doppler frequency of the first distance-Doppler unit may be determined according to Formula (3).

Figure 7C:
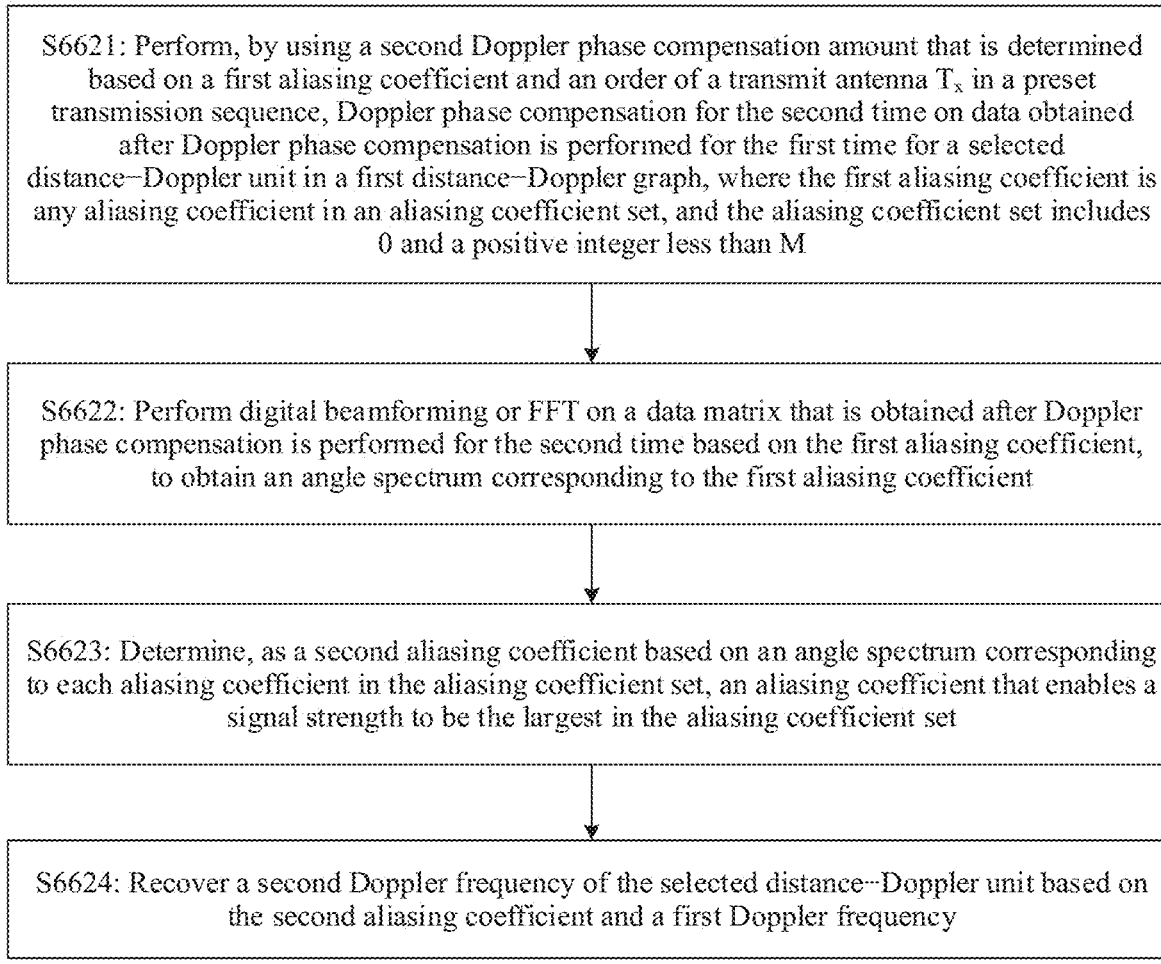
FIG. 7C is a schematic flowchart of another implementation method for recovering a second Doppler frequency of a first distance-Doppler unit according to an embodiment of this application.

In a second implementation of step S66:

The second implementation method of step S66 is described in the following with reference to a schematic flowchart of another implementation method for recovering the second Doppler frequency of the first distance-Doppler unit shown in FIG. 7C. The implementation method may include but is not limited to some or all of the following steps:

Step S6621: Perform, by using a second Doppler phase compensation amount that is determined based on a first aliasing coefficient and an order of the transmit antenna $T_x$ in the first transmission sequence, Doppler phase compensation for the second time on data obtained after Doppler phase compensation is performed for the first time for the first distance-Doppler unit in the first distance-Doppler graph. The first aliasing coefficient is any aliasing coefficient in an aliasing coefficient set. The aliasing coefficient set includes 0 and a positive integer less than M. Refer to the related description in the foregoing step S581. Details are not described again in this embodiment of this application.

Likewise, data obtained after Doppler phase compensation is performed for the second time for a selected distance-Doppler unit in each of the M*N distance-Doppler graphs is performed by using each aliasing coefficient in the aliasing coefficient set may be obtained.

Step S6622: Perform digital beamforming (DBF) or FFT on a data matrix obtained after Doppler phase compensation is performed for the second time based on the first aliasing coefficient, to obtain an angle spectrum corresponding to the first aliasing coefficient.

Likewise, an angle spectrum corresponding to each aliasing coefficient in the aliasing coefficient set may be obtained.

Step S6623: Determine, as the second aliasing coefficient based on the angle spectrum corresponding to each aliasing coefficient in the aliasing coefficient set, an aliasing coefficient that enables the signal strength to be the largest in the aliasing coefficient set.

It may be understood that there may be further another implementation for determining the second aliasing coefficient. This is not limited in this embodiment of this application.

Step S6624: Recover the second Doppler frequency of the first distance-Doppler unit based on the second aliasing coefficient and the first Doppler frequency.

Specifically, the second Doppler frequency of the first distance-Doppler unit may be determined according to Formula (3).

Figure 8A:
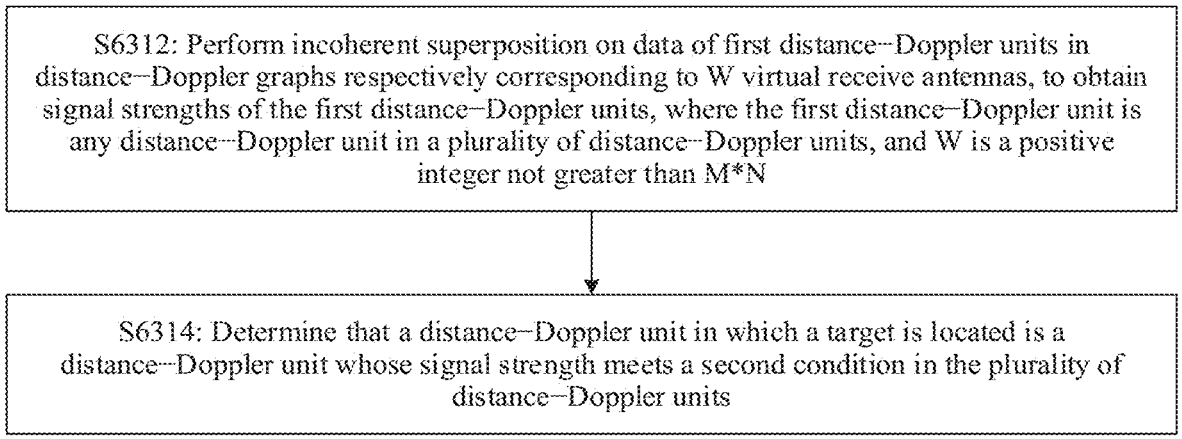
FIG. 8A is a schematic flowchart of a method for determining a distance-Doppler unit in which a target is located according to an embodiment of this application.

In an embodiment of the present application, after step S62 and before step 64, or after step S64 and before step S6611 or S6621, or after step S66, the method may further include a step of determining a distance-Doppler unit in which a target is located. It should be understood that, the radar system obtains a signal strength of each distance-Doppler unit based on the M*N distance-Doppler graphs, and further detects the target through constant false alarm rate (CFAR) detection. It should be understood that one or more targets may be detected. In this embodiment of this application, the method for determining the distance-Doppler unit in which the target is located may include but is not limited to the following two implementations:

Implementation 1:

The first implementation method of step S63 is described in the following with reference to a schematic flowchart of a method for determining the distance-Doppler unit in which the target is located shown in FIG. 8A The implementation method may include but is not limited to some or all of the following steps:

S6312. Perform incoherent superposition on data of second distance-Doppler units in distance-Doppler graphs respectively corresponding to W virtual receive antennas, to obtain signal strengths of the first distance-Doppler units. The second distance-Doppler unit is any distance-Doppler unit in the plurality of distance-Doppler units. W is a positive integer not greater than M*N.

Specifically, data of the distance-Doppler unit (r, v) in the distance-Doppler graph corresponding to the virtual receive antenna $R_{x,y}$ may be represented as $S_{x,y}(f_{r,v})$.

For example, W=M*N, the signal strength of the distance-Doppler unit (r, v) may be represented as follows:

$$Q(r, v) = \sum_{x=1}^{M} \sum_{y=1}^{N} |S_{x,y}(r, v)|^2 \quad (6)$$

In another embodiment of this application, W may be not greater than M*N. The signal strength of the distance-Doppler unit (r, v) may be obtained in the following manner: selecting the W distance-Doppler graphs in the M*N distance-Doppler graphs, and performing incoherent superposition on data of the distance-Doppler units (r, v) in the W distance-Doppler graphs, to obtain the signal strengths of the distance-Doppler units (r, v).

Likewise, a signal strength of any distance-Doppler unit may be obtained.

S6314. Determine that the distance-Doppler unit in which the target is located is a distance-Doppler unit whose signal strength meets a second condition in the plurality of distance-Doppler units.

Specifically, detection may be performed on the target based on a CFAR. The CFAR is a target detection algorithm having a preset detection threshold. The detection threshold may be a fixed value, may be adjusted adaptively with a signal strength of a detected unit, or may be a threshold formed based on a technology of obtaining a part of first detection information of interference statistics distribution.

It may be considered that when the signal strength of the detected distance-Doppler unit is greater than the detection threshold, the detected distance-Doppler unit is the distance-Doppler unit in which the target is located.

Implementation 2:

The following describes the second implementation method of step S63 with reference to a schematic flowchart of another method for determining the distance-Doppler unit in which the target is located shown in FIG. 8B and a schematic diagram of determining the distance-Doppler unit in which the target is located shown in FIG. 8C. FIG. 8C corresponds to FIG. 6A to FIG. 6C. FIG. 7B is described by using an example in which the first distance-Doppler unit is a unit shown in a black grid in FIG. 6C. The implementation method may include but is not limited to some or all of the following steps:

Step S6322: Perform, in a plurality of angles, coherent superposition on data of second distance-Doppler units in N2 distance-Doppler graphs, and perform incoherent superposition on data obtained after the coherent superposition, to obtain third signal strengths. N distance-Doppler graphs include the N2 distance-Doppler graphs, the N distance-Doppler graphs include a distance-Doppler graph corresponding to any virtual receive antenna in a virtual MIMO subarray corresponding to a transmit antenna $T_x$, and N2 is a positive integer not greater than N.

In this embodiment of this application, the transmit antenna $T_x$ is used as an example for description. The virtual MIMO subarray corresponding to the transmit antenna $T_x$ includes virtual receive antennas $R_{1,x}, R_{2,x}, \ldots,$ and $R_{N,x}$.

An angle $\delta_z$ in an FoV of the radar system may be selected. The angle $\delta_z$ is any angle of Z angles. Z is a positive integer. Coherent superposition is performed in the angle $\delta_z$ on M2 pieces of data in the data of the first distance-Doppler units (r, v) in the N2 distance-Doppler graphs, that is, in $S_{x,1}(f_{r,v}), S_{x,2}(f_{r,v}), \ldots,$ and $S_{x,N}(f_{r,v})$. Likewise, data obtained after the coherent superposition performed on the foregoing N2 pieces of data in each of Z angles may be obtained. Further, incoherent combination is performed on the data obtained after the coherent superposition, to obtain the third signal strengths. The third signal strength is a signal strength $Q_x(f_{r,v})$ of a signal transmitted by the transmit antenna $T_x$ in the first distance-Doppler unit (r, v).

Likewise, a signal strength of each of the M transmit antennas in the first distance-Doppler unit (r, v) may be obtained.

It should be noted that Z may be equal to 1.

Step S6324: Perform incoherent superposition on third signal strengths respectively corresponding to M2 transmit antennas, to obtain fourth signal strengths. The M transmit antennas include the M2 transmit antennas, and M2 is a positive integer not greater than M.

For example, M2=M, the fourth signal strength of the first distance-Doppler unit (r, v) may be represented as follows:

$$Q(f_{r,v}) = \sum_{x=1}^{M} Q_x(f_{r,v}) \quad (7)$$

Step S6326: Determine that the distance-Doppler unit in which the target is located is a distance-Doppler unit that enables the fourth signal strength to meet the second condition in the plurality of distance-Doppler units.

The fourth signal strength in step S6326 may be equivalent to the signal strength in step S6314. For a specific implementation of step S6326, refer to the related description in step S6314. Details are not described again in this embodiment of this application.

It should be noted that, when step S63 is performed after step S64, in Implementation 1 of step S63, the data used for incoherent superposition may be data obtained after Doppler phase compensation is performed for the first time and/or Doppler phase compensation is performed for the second time for the second distance-Doppler unit in each distance-Doppler graph. A specific implementation is the same as Implementation 1. Details are not described again in this embodiment of this application. Likewise, in Implementation 2 of step S63, the data used for coherent superposition may be data obtained after Doppler phase compensation is performed for the first time and/or Doppler phase compensation is performed for the second time based on the second Doppler frequency for the second distance-Doppler unit in each distance-Doppler graph. A specific implementation is the same as Implementation 2. Details are not described again in this embodiment of this application.

It should be further noted that, in another embodiment of this application, after a signal strength of each unit is obtained, determining the distance-Doppler unit in which the target is located may be performed by using two steps. For example, before S64, detection is performed on the target for the first time, to obtain the estimated distance-Doppler unit in which the target is located. In this case, Doppler phase compensation may be performed for the first time and Doppler phase compensation may be performed for the second time in step S64 by using the estimated distance-Doppler unit in which the target is located as the first distance-Doppler unit, to finally recover the second Doppler frequency of the estimated distance-Doppler unit in which the target is located. Further, detection is performed on the target for a second time, to determine, in the estimated distance-Doppler unit in which the target is located, the distance-Doppler unit in which the target is located.

Target detection performed for the first time may be CFAR detection in a distance direction, and target detection performed for the second time may be CFAR detection in a Doppler frequency direction. Alternatively, target detection performed for the first time may be CFAR detection in a Doppler frequency direction, and target detection performed for the second time may be CFAR detection in a distance direction. When the target is detected in both directions for the same distance-Doppler unit, the distance-Doppler unit is the unit in which the target is located.

It should be understood that the distance-Doppler unit in which the target is located may also be detected by using another target detection method. This is not limited in this embodiment of this application.

After steps S63 and S66, this embodiment of the present application may include the following steps.

Step S68: Measure a parameter of the target based on the second Doppler frequency recovered for the distance-Doppler unit and/or the second aliasing coefficient determined for the distance-Doppler unit in which the target is located.

The second Doppler frequency recovered for the distance-Doppler unit in which the target is located may be obtained, and the second aliasing coefficient determined for the distance-Doppler unit in which the target is located may be determined. The parameter of the target may be calculated based on the data of the distance-Doppler unit in which the target is located, the second aliasing coefficient, and/or the second Doppler frequency, for example, a relative distance, a relative velocity, or a relative angle. It should be understood that the parameter is a parameter relative to the radar system.

The distance-Doppler unit in which the target is located is a unit that is determined based on a third Doppler frequency and a second distance and that is in the distance-Doppler graph. In this case, the relative distance of the target is the second distance. The second distance is calculated in a process of calculating the distance-Doppler graph. A frequency obtained after Fourier transform is performed for the first time may be obtained according to Formula (1).

The relative velocity of the target is calculated according to Formula (2).

$$v_p = \frac{\lambda_c f_p}{2}$$

$v_p$ represents the relative velocity, $f_p$ represents the second Doppler frequency recovered for the distance-Doppler unit in which the target is located, and $\lambda_c$ represents a carrier wavelength.

Calculating the relative angle may include but is not limited to the following steps:

S681. Perform, by using a first Doppler phase compensation amount and a second Doppler phase compensation amount that are determined based on the third aliasing coefficient, a third time of Doppler phase compensation on the data of the distance-Doppler unit in which the target is located. The third aliasing coefficient is a second aliasing coefficient determined for the distance-Doppler unit in which the target is located.

It should be understood that when the distance-Doppler unit in which the target is located is the first distance-Doppler unit, the third aliasing coefficient is the second aliasing coefficient determined for the first distance-Doppler unit.

S682. Measure the relative angle of the target based on the data obtained after the third time of Doppler phase compensation of the distance-Doppler unit in which the target is located.

It should be understood that the data of the distance-Doppler unit in which the target is located is a data matrix, and includes the data of the distance-Doppler unit in which the target is located in the M*N distance-Doppler graphs.

Specifically, angle calculation is related to antenna distribution. It is assumed that M*N virtual receive antennas are arranged at equal distances in a uniform linear receive array, and a distance between two adjacent receive antennas is d. A first angle spectrum is obtained by performing FFT on the data obtained after the third time of Doppler phase compensation of the distance-Doppler unit in which the target is located. A vertical coordinate of the first angle spectrum is an amplitude value or a power, and a horizontal coordinate is a frequency.

$$\theta = \sin^{-1}\left(\frac{k_a \lambda_c}{MNd}\right)$$

$k_a$ represents a coordinate of a frequency of the target on the angle spectrum, and $\theta$ represents the relative angle.

It should be understood that an angle measurement method may further include but is not limited to beamforming, multiple signal classification (MUSIC), or the like. This is not limited in this embodiment of the present application.

The following describes an application instance of the signal transmitting method and the signal processing method provided in the embodiments of this application.

Figure 9A:
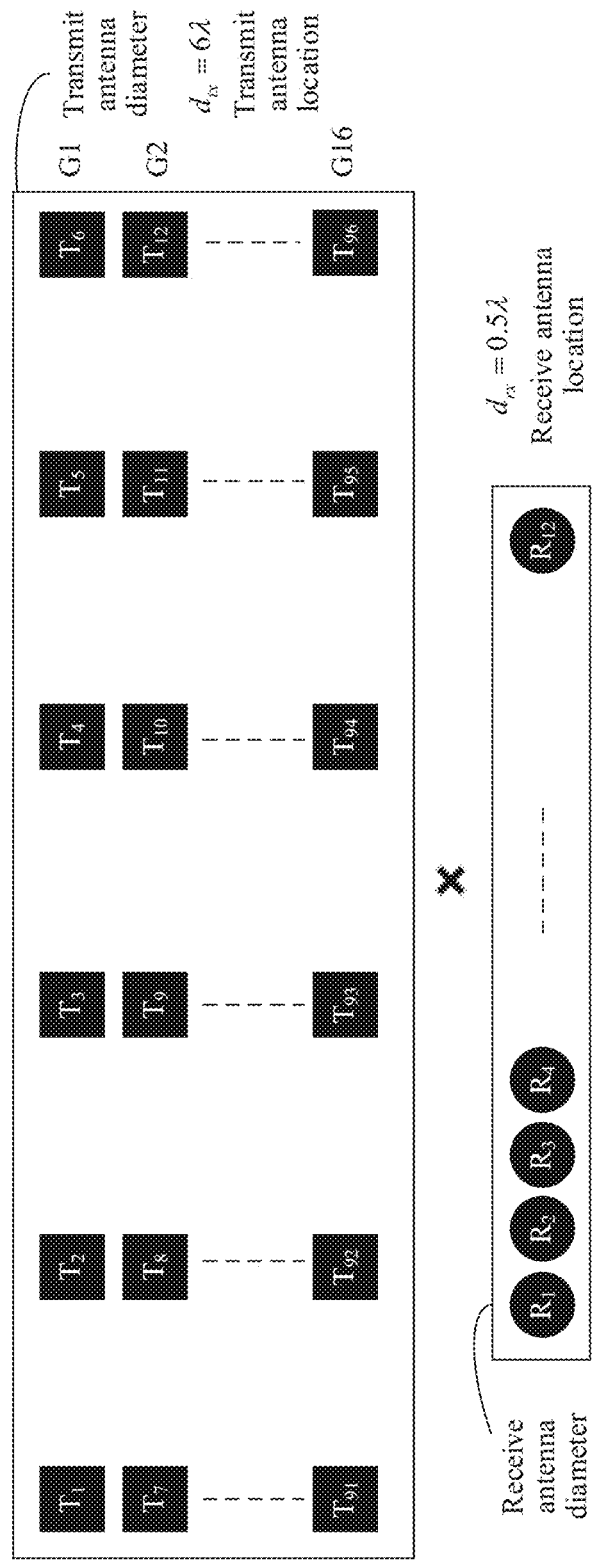
FIG. 9A is a schematic diagram of still another antenna array according to an embodiment of this application.

FIG. 9A shows an antenna array according to an embodiment of the present application. The antenna array includes M (M=96) transmit antennas and N (N=12) receive antennas. A distance between two adjacent transmit antennas is 6λ, and a distance between two adjacent receive antennas is 0.5λ. λ represents a carrier wavelength.

A virtual MIMO array response after Doppler phase compensation is performed for the first time is defined as follows.

$$a_{MIMO}(\theta_V,\theta_H,\xi)=\{a_D \square [a_{txV}(\theta_V) \otimes a_{txH}(\theta_H)]\} \otimes [a_{txV}(\theta_V) \otimes a_{txH}(\theta_H)]$$

$$a_D = e^{j2\pi \frac{\xi D'}{M}},$$

$a_{txV}(\theta_V)$ and $a_{txH}(\theta_H)$ respectively represent a horizontal array response vector and a vertical array response vector of a transmit antenna, $\theta_V$ represents a horizontal angle, $\theta_H$ represents a vertical angle, $\otimes$ represents an inner product (Kronecker tensor product), and $\square$ represents an out product (element-wise product).

Time numbers V of a transmission sequence of the 96 transmit antennas arranged based on spatial locations are as follows:

D'=[92, 16, 30, 45, 74, 15, 9, 64, 67, 43, 58, 4, 76, 78, 71, 21, 18, 8, 87, 11, 34, 38, 56, 81, 46, 75, 52, 1, 9, 5, 94, 31, 66, 57, 88, 2, 10, 50, 82, 6, 33, 27, 62, 17, 3, 86, 29, 39, 24, 63, 85, 32, 7, 44, 73, 47, 42, 14, 72, 93, 83, 89, 77, 91, 28, 5, 51, 69, 13, 59, 12, 22, 49, 80, 36, 84, 0, 37, 55, 40, 70, 60, 25, 90, 23, 79, 68, 65, 61, 41, 48, 35, 19, 26, 53, 20, 54]$^T$

An ambiguity function is defined as follows.

$$\gamma(\theta_V,\theta_H,\xi)=|a_{t,MIMO}^H(\theta_V,\theta_H,\xi) \square a_{t,MIMO}(\theta_V,\theta_H,\xi)|^2$$

The ambiguity function describes differentiation of an angle and a velocity aliasing coefficient during Doppler extension.

Figure 9B:
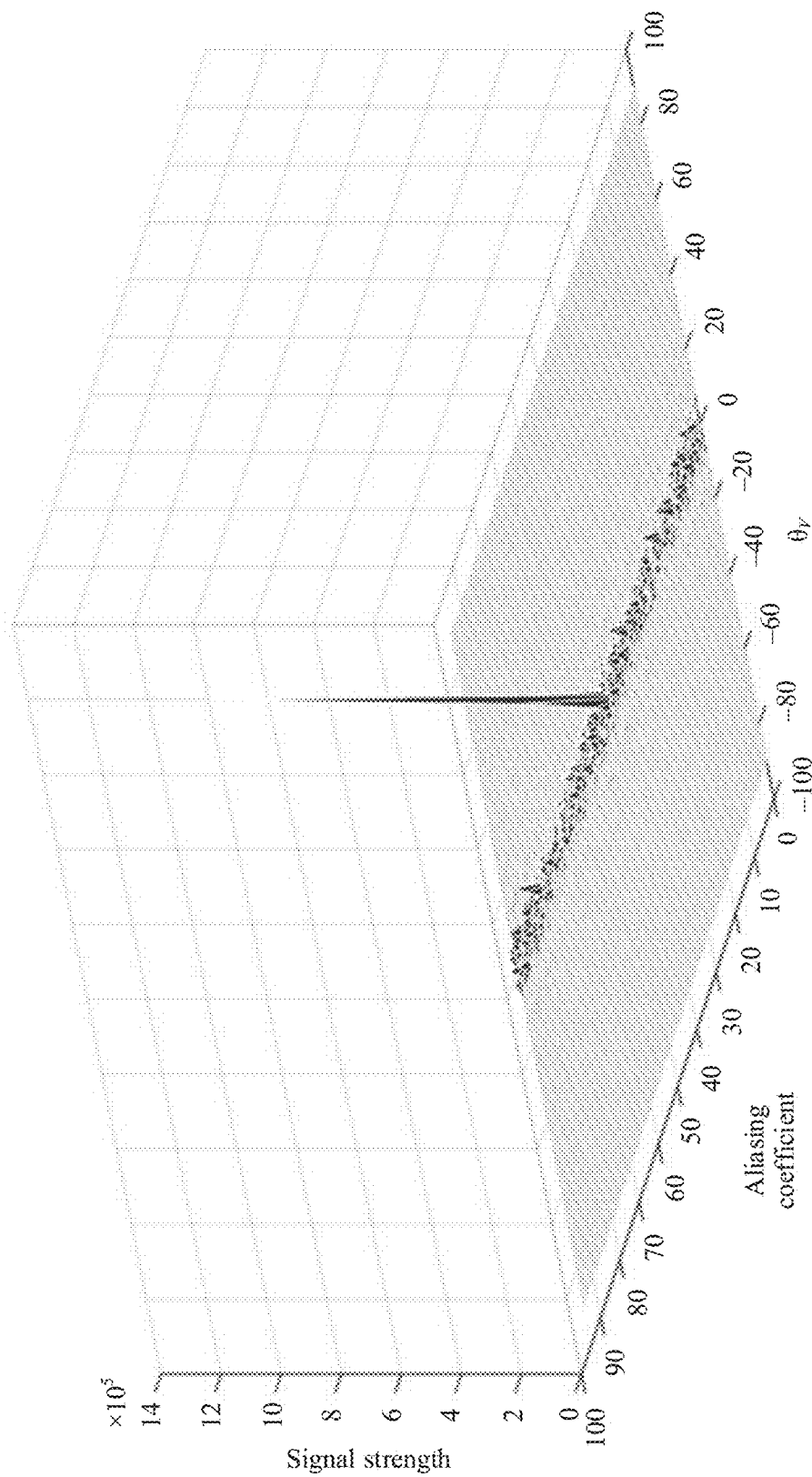
FIG. 9B is an ambiguity function diagram of a horizontal angle and a velocity aliasing coefficient according to an embodiment of this application.
Figure 9C:
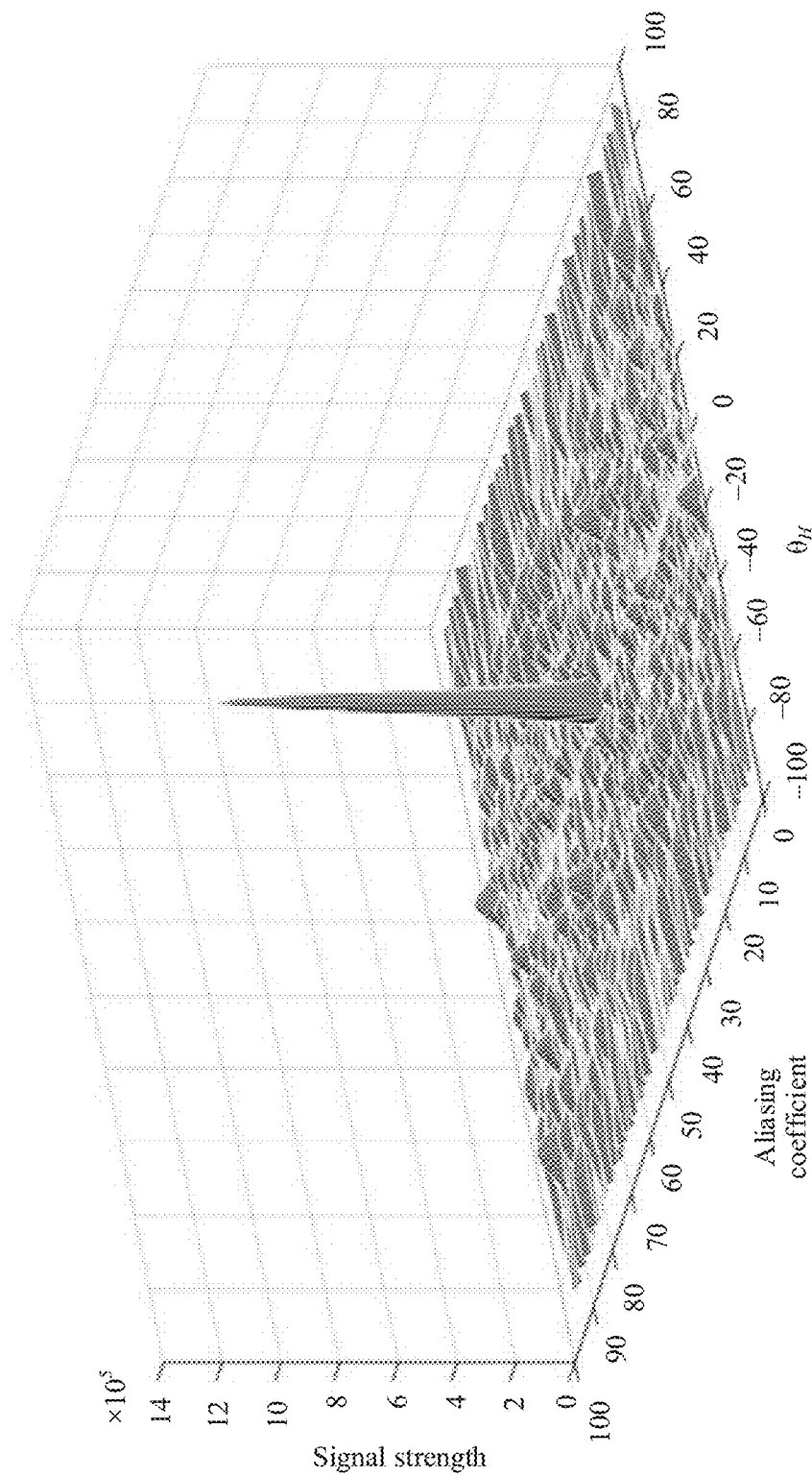
FIG. 9C is an ambiguity function diagram of a vertical angle and a velocity aliasing coefficient according to an embodiment of this application.

Transmission is performed according to the transmission sequence provided in this embodiment of this application. An ambiguity function diagram of a horizontal/vertical angle and a velocity aliasing coefficient is obtained by analyzing echo signals. FIG. 9B is an ambiguity function diagram of a horizontal angle and a velocity aliasing coefficient. FIG. 9C is an ambiguity function diagram of a vertical angle and a velocity aliasing coefficient. It is learned that the parameter of the target is $\theta_V$=0° and $\theta_H$=0°. FIG. 9B and FIG. 9C show only one peak. It indicates that by using the signal transmitting method and the signal processing method provided in the embodiments of this application, a velocity of the target can be recovered, and a velocity measurement range can be recovered to a velocity measurement range before the aliasing.

Figure 9D:
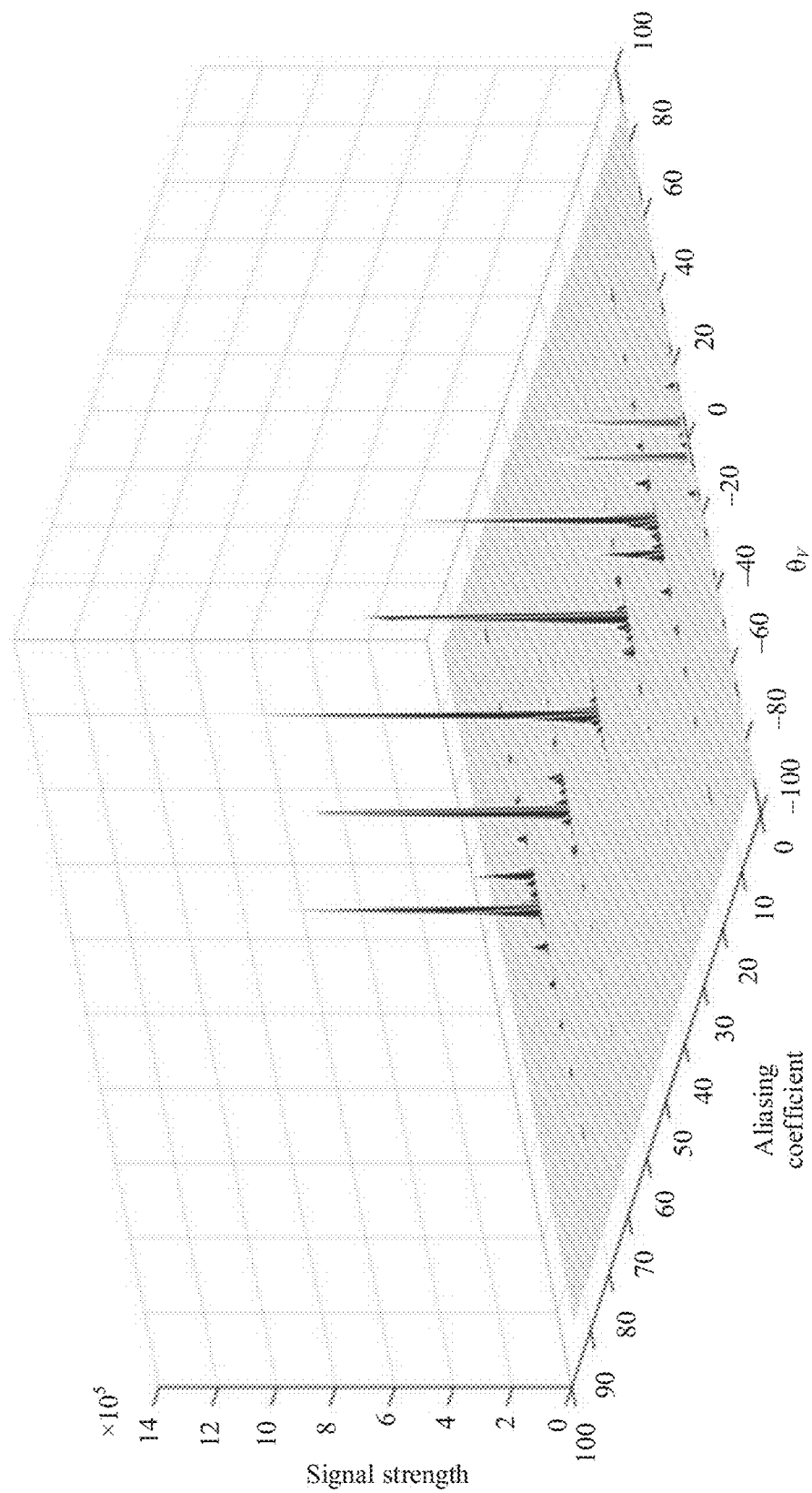
FIG. 9D is another ambiguity function diagram of a horizontal angle and a velocity aliasing coefficient according to an embodiment of this application.
Figure 9E:
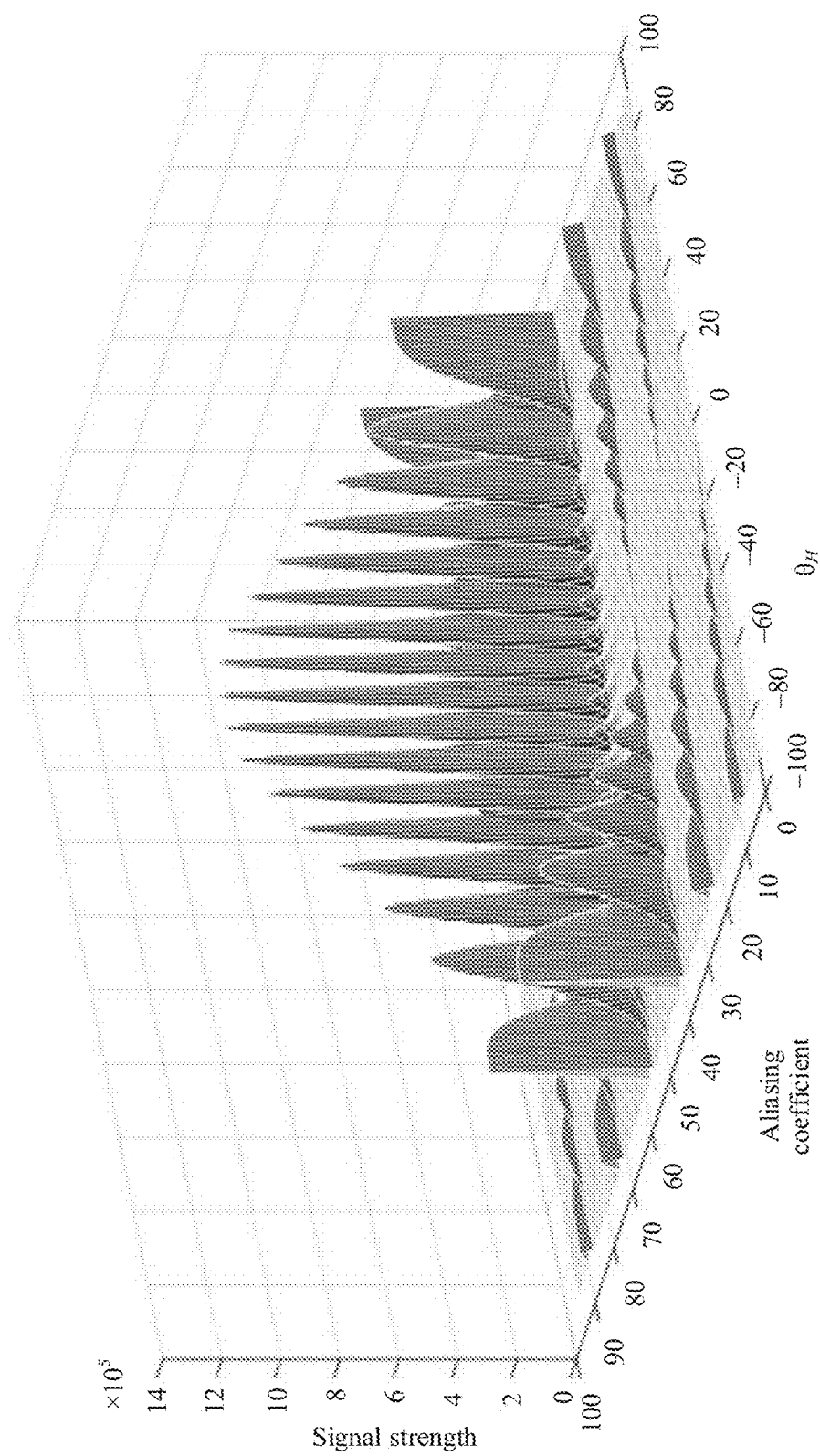
FIG. 9E is another ambiguity function diagram of a vertical angle and a velocity aliasing coefficient according to an embodiment of this application.

In comparison, the 96 transmit antennas perform transmission according to the sequence formed through arrangement based on the spatial locations. The ambiguity function diagram of the horizontal/vertical angle and the velocity aliasing coefficient is obtained by analyzing the echo signals. FIG. 9D is an ambiguity function diagram of a horizontal angle and a velocity aliasing coefficient. FIG. 9E is an ambiguity function diagram of a vertical angle and a velocity aliasing coefficient. It is learned that the parameter of the target is $\theta_V$=0° and $\theta_H$=0°. FIG. 9D and FIG. 9E show a plurality of peaks. Confounding occurs between a velocity and an angle. The velocity and the angle cannot be differentiated.

In conclusion, in this embodiment of this application, correlation between space and a Doppler phase is reduced by changing a switching order of transmit antennas in the array antenna. In this way, an actual velocity of the target can be recovered, and the velocity measurement range can be recovered to the velocity measurement range before aliasing.

The following describes an apparatus or a device designed in the embodiments of this application.

Figure 10:
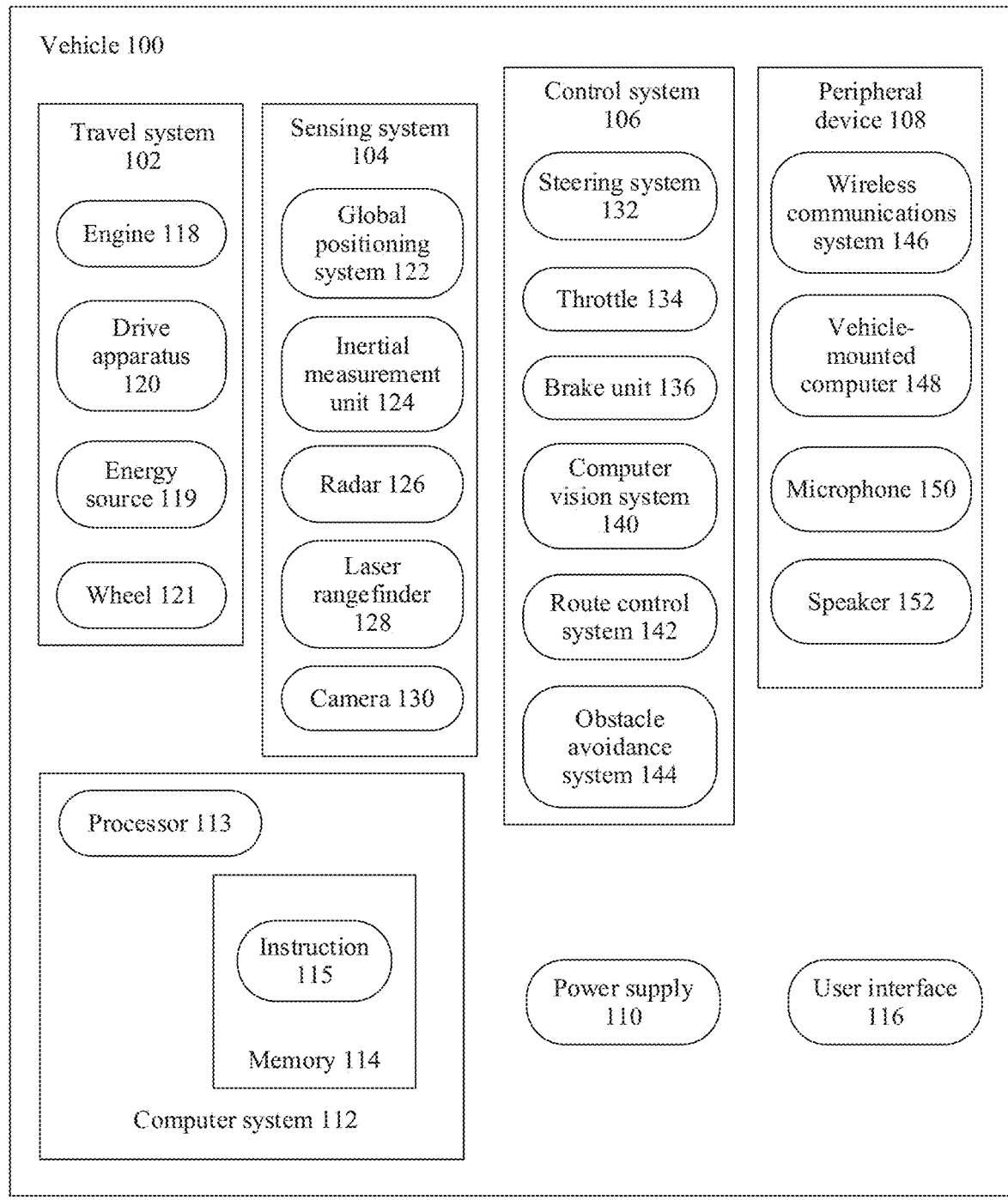
FIG. 10 is a function block diagram of a vehicle according to an embodiment of the present application.

FIG. 10 is a function block diagram of a vehicle 100 according to an embodiment of the present application. In an embodiment, the vehicle 100 is configured in a fully or partially autonomous mode. For example, the vehicle 100 may control itself while in the autonomous mode. The vehicle 100 may determine a current status of the vehicle and a surrounding environment of the vehicle through manual operation, determine a possible action of at least one other vehicle in the surrounding environment, determine a confidence level corresponding to a possibility of the possible action of the other vehicle, and control the vehicle 100 based on determined information. When the vehicle 100 is in the autonomous mode, the vehicle 100 may be set to operate without interaction with people.

The vehicle 100 may include various subsystems, for example, a movement system 102, a sensor system 104, a control system 106, one or more peripheral devices 108, and a power supply 110, a computer system 112, and a user interface 116. Optionally, the vehicle 100 may include more or less subsystems, and each subsystem may include a plurality of components. In addition, the subsystems and the components of the vehicle 100 may be connected to each other in a wired or wireless manner.

The movement system 102 may include a component for providing powered motion for the vehicle 100. In an embodiment, the movement system 102 may include an engine 118, an energy source 119, a drive apparatus 120, and wheels/tires 121. The engine 118 may be an internal combustion type engine, a motor, an air compression engine, or another type of engine combination, for example, a hybrid engine including a gasoline engine and a motor, or a hybrid engine including an internal combustion type engine and an air compression engine. The engine 118 converts the energy source 119 into mechanical energy.

Examples of the energy source 119 include gasoline, diesel, other petroleum-based fuel, propane, other compressed gas-based fuel, ethanol, a solar panel, a battery, and other power supply. The energy source 119 may also provide energy for other systems of the vehicle 1M.

The drive apparatus 120 may transmit mechanical force from the engine 118 to the wheels 121. The drive apparatus 120 may include a gearbox, a differential, and a drive shaft. In an embodiment, the drive apparatus 120 may further include another component, for example, a clutch. The drive shaft may include one or more shafts that may be coupled to one or more wheels 121.

The sensor system 104 may include several sensors for sensing information about the surrounding environment of the vehicle 100. For example, the sensor system 104 may include a positioning system 122 (the positioning system may be a GPS system, a BDS system, or another positioning system), an inertial measurement unit (IMU) 124, a radar system 126, a laser rangefinder 128, and a camera 130. The sensor system 104 may further include a sensor (for example, an in-vehicle air quality monitor, a fuel gauge, or an engine oil thermometer) that monitors an internal system of the vehicle 100. Sensor data from one or more of these sensors can be used to detect an object and a corresponding feature (a location, a shape, a direction, a velocity, or the like) of the target. The detection and the identification are key functions of safety operations of the autonomous vehicle 100.

The positioning system 122 may be configured to estimate a geographic location of the vehicle 100. The IMU 124 is configured to sense a location change and an orientation change of the vehicle 100 based on an inertial acceleration. In an embodiment, the IMU 124 may be a combination of an accelerometer and a gyroscope.

The radar system 126 may use radio signals to sense an object in the surrounding environment of the vehicle 100. In some embodiments, in addition to sensing the object, the radar 126 may be further configured to sense a velocity and/or a moving direction of the object. For a specific function unit of the radar system 123, refer to the related description in FIG. 1A or FIG. 1B. Details are not described again in this embodiment of this application.

The laser rangefinder 128 may use lasers to sense an object in the environment in which the vehicle 100 is located. In some embodiments, the laser rangefinder 128 may include one or more laser sources, laser scanners, one or more detectors, and other system components.

The camera 130 may be configured to capture a plurality of images of the surrounding environment of the vehicle 100. The camera 130 may be a static camera or a video camera.

The control system 106 controls operations of both the vehicle 100 and the components of the vehicle 100. The control system 106 may include a plurality of elements, including a steering system 132, a throttle 134, a brake unit 136, a sensor fusion algorithm 138, a computer vision system 140, a route control system 142, and an obstacle avoidance system 144.

The steering system 132 may operate to adjust the forward direction of the vehicle 100. For example, in an embodiment, the steering system 132 may be a steering wheel system.

The throttle 134 is configured to: control an operating speed of the engine 118, and further control a velocity of the vehicle 100.

The brake unit 136 is configured to control the vehicle 100 to decelerate. The brake unit 136 may slow down the wheels 121 by using friction. In another embodiment, the brake unit 136 may convert kinetic energy of the wheels 121 into a current. The brake unit 136 may alternatively slow down a rotation speed of the wheels 121 in another form, to control the velocity of the vehicle 100.

The computer vision system 140 may operate to process and analyze the images captured by the camera 130 to identify an object and/or a feature in the surrounding environment of the vehicle 100. The object and/or feature may include a traffic signal, a road boundary, and an obstacle. The computer vision system 140 may use an object identification algorithm, a structure from motion (SFM) algorithm, video tracking, or another computer vision technology. In some examples, the computer vision system 140 may be additionally configured to: map an environment, track an object, estimate a velocity of an object, and the like.

The route control system 142 is configured to determine a driving route of the vehicle 100. In some examples, the route control system 142 may combine data from the sensor 138, the GPS 122, and one or more predetermined maps, to determine the driving route for the vehicle 100.

The obstacle avoidance system 144 is configured to identify, evaluate, and avoid or surpass a potential obstacle in the environment of the vehicle 100 in another manner.

Certainly, in an instance, the control system 106 may additionally or alternatively include a component other than those shown and described components. Alternatively, some of the components shown above may be reduced.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a loudspeaker 152.

In some embodiments, the peripheral device 108 provides a means for the user of vehicle 100 to interact with a user interface 116. For example, the vehicle-mounted computer 148 may provide information for the user of the vehicle 100. The user interface 116 may further operate the vehicle-mounted computer 148 to receive input from the user. The vehicle-mounted computer 148 may be operated by using a touchscreen. In another case, the peripheral device 108 may provide a means for the vehicle 100 to communicate with another device located in the vehicle. For example, the microphone 150 may receive audio (for example, a voice command or other audio input) from the user of the vehicle 100. Likewise, the loudspeaker 152 may output audio to the user of the vehicle 100.

The wireless communications system 146 may wirelessly communicate with one or more devices directly or through a communications network. For example, the wireless communications system 146 may use 3G cellular communication, for example, CDMA, EVDO, GSM/GPRS, or 4G cellular communication such as LTE, or 5G cellular communication. The wireless communications system 146 may use WiFi to communicate with a wireless local area network (WLAN). In some embodiments, the wireless communications system 146 may directly communicate with a device through an infrared link, Bluetooth, or ZigBee. In another wireless protocol, for example, the wireless communications system 146 in various vehicle communications systems may include one or more dedicated short range communications (DSRC) devices. These devices may include common and/or private data communication between vehicles and/or roadside stations.

The power supply 110 may supply power to the components of the vehicle 100. In an embodiment, the power supply 110 may be a rechargeable lithium-ion or lead-acid battery. One or more battery sets of this type of battery may be configured to supply power to the components of the vehicle 100. In some embodiments, the power supply 110 and the energy source 119 may be implemented together, for example, in some all-electric cars.

Some or all of functions of the vehicle 100 are controlled by the computer system 112. The computer system 112 may include at least one processor 113. The processor 113 executes an instruction 115 stored in a non-transient computer readable medium such as a data storage apparatus 114. The computer system 112 may further be a plurality of computing devices that control the components or the subsystems of the vehicle 100 in a distributed manner.

The processor 113 may be any conventional processor, for example, a commercially available CPU. Alternatively, the processor may be a dedicated device such as an ASIC or another hardware-based processor. FIG. 10 shows a function diagram including a processor, a memory, and other components of the computer 110 in the same block. A person of ordinary skill in the art should understand that the processor, the computer, or the memory may actually include a plurality of processors, computers, or memories that may or may not be stored in the same physical housing. For example, the memory may be a hard disk drive or another storage medium located in a housing different from the computer 110. Therefore, reference to a processor or a computer is understood as reference to a set of processors or computers or memories that may or may not operate in parallel. Some components, for example, the steering component and a deceleration component each may have its own processor. The processor performs only calculation related to functions specific to the components. This is different from a process in which a single processor performs the described steps.

It should be understood that the processor in the radar system 126 and the processor 113 may be the same processor or different processors. This is not limited in this embodiment of this application.

In the aspects described herein, the processor may be located away from the vehicle and wirelessly communicate with the vehicle. In another aspect, some of the processes described herein are executed by the processor disposed in the vehicle, and other processes are executed by a remote processor. The processes include performing a necessary step for a single operation.

In some embodiments, the data storage apparatus 114 may include the instruction 115 (for example, program logic). The instruction 115 may be executed by the processor 113 to implement various functions of the vehicle 100. The various functions include the functions described above. The data storage apparatus 114 may also include additional instructions, including instructions to send data to, receive data from, interact with, and/or control one or more of the propulsion system 102, the sensor system 104, the control system 106, and the peripheral device 108.

In addition to the instruction 115, the data storage apparatus 114 may further store data, for example, a road map, route information, a location of a vehicle, a direction, a velocity, other vehicle data, and other information. The information may be used by the vehicle 100 and the computer system 112 during operation of the vehicle 100 in an autonomous mode, a semi-autonomous mode, and/or a manual mode.

In this embodiment of this application, the processor in the radar system 126 or the processor 113 invokes the data stored in the data storage apparatus 114 and program code for implementing the signal processing method and the method in which an array antenna transmits a signal, to implement the signal processing method and the method in which an array antenna transmits a signal in the embodiments of this application. For details, refer to the related description in the foregoing method embodiment. Details are not described herein again.

The user interface 116 is configured to provide information for or receive information from the user of the vehicle 100. Optionally, the user interface 116 may include one or more input/output devices within a set of peripheral devices 108, for example, a wireless communications system 146, a vehicle-mounted computer 148, a microphone 150, and a speaker 152.

The computer system 112 may control functions of the vehicle 100 based on input received from various subsystems (for example, the movement system 102, the sensor system 104, and the control system 106) and from the user interface 116. For example, the computer system 112 may use the input from the control system 106 to control the steering unit 132 to avoid an obstacle detected by the sensor system 104 and the obstacle avoidance system 144. In some embodiments, the computer system 112 may operate to control many aspects of the vehicle 100 and the subsystems of the vehicle 100.

Optionally, one or more of the foregoing components may be separately installed with the vehicle 100 or associated with the vehicle 100. For example, the data storage apparatus 114 may be partially or completely separate from the vehicle 100. The foregoing components may be communicatively coupled together in a wired and/or wireless manner.

Optionally, the foregoing components are merely an example. In actual application, components in the foregoing modules may be added or deleted according to an actual requirement. FIG. 10 should not be understood as a limitation on this embodiment of the present application.

An autonomous vehicle moving on a road, for example, the vehicle 100 may identify an object in the surrounding environment of the vehicle, to determine an adjustment to a current velocity. The object may be another vehicle, a traffic control device, or another type of object. In some examples, each identified object may be considered independently, and may be used to determine the velocity to be adjusted by the autonomous vehicle based on features of the object, for example, a current velocity, an acceleration, and a distance to a vehicle.

Optionally, the autonomous vehicle 100 or a computing device associated with the autonomous vehicle 100 (for example, the computer system 112, the computer vision system 140, or the data storage apparatus 114 in FIG. 10) may predict an action of the identified object based on a feature of the identified object and a status of the surrounding environment (for example, traffic, rain, and ice on a road). Optionally, each identified object depends on an action of the object. Therefore, all identified objects may be considered together to predict an action of a single identified object. The vehicle 100 can adjust the velocity of the vehicle 100 based on the predicted action of the identified object. In other words, the autonomous vehicle can determine, based on the predicted action of the object, a stable state to which the vehicle needs to be adjusted (for example, acceleration, deceleration, or stop). In this process, another factor may also be considered to determine the velocity of the vehicle 100, for example, a lateral location of the vehicle 100 driving on a road, a curvature of the road, or proximity of a static object and a dynamic object.

In addition to providing an instruction for adjusting the velocity of the autonomous vehicle, the computing device may further provide an instruction for changing a steering angle of the vehicle 100, so that the autonomous vehicle follows a given track and/or maintains safe lateral and longitudinal distances from an object near the autonomous vehicle (for example, a car in an adjacent lane of the road).

The vehicle 100 may be a car, a truck, a motorcycle, a bus, a boat, an aircraft, a helicopter, a lawn mower, an entertainment car, a vehicle in an amusement park, a construction device, a trolley, a golf cart, a train, a handcart, or the like. This is not specifically limited in this embodiment of the present application.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A signal processing method, applied to a radar system comprising an array antenna, the method comprising:
   sequentially transmitting signals according to a first transmission sequence through M transmit antennas, wherein the first transmission sequence is different from a sequence formed by arranging the M transmit antennas based on spatial locations thereof;
   receiving, through N receive antennas, echo signals formed by reflection of the transmitted signals off of a target, wherein M and N are positive integers, and M is greater than 2; and
   measuring a parameter of the target based on the echo signals.

2. The method according to claim 1, wherein the first transmission sequence is obtained by transforming an arrangement of at least two transmit antennas in the sequence formed by arranging the M transmit antennas based on the spatial locations.

3. The method according to claim 1, wherein any two adjacent transmit antennas in the sequence formed by arranging the M transmit antennas based on the spatial locations are not adjacent in the first transmission sequence.

4. The method according to claim 1, wherein the M transmit antennas are M physical antennas.

5. The method according to claim 1, wherein the M antennas are obtained by multiplexing at least one of P physical antennas, wherein P is a positive integer, and $3 \leq P \leq M$.

6. The method according to claim 1, wherein measuring the parameter of the target based on the echo signals comprises:
   calculating, based on the echo signals, a distance-Doppler graph corresponding to each virtual receive antenna of a plurality of virtual receive antennae, to obtain M*N distance-Doppler graphs, wherein each virtual receive antenna of the plurality is an array element in a virtual MIMO array comprising the M transmit antennas and the N receive antennas, and each distance-Doppler graph is divided into a plurality of distance-Doppler units arranged in an array;
   performing Doppler phase compensation for a first time on data of a first distance-Doppler unit in a first distance-Doppler graph of the distance-Doppler graphs corresponding to the virtual receive antennae by using a first Doppler phase compensation amount that is determined based on an order of a transmit antenna $T_x$ in the first transmission sequence, wherein the first distance-Doppler graph corresponds to any virtual receive antenna in a virtual MIMO subarray corresponding to the transmit antenna $T_x$, the transmit antenna $T_x$ is any transmit antenna in the M transmit antennas, and the first distance-Doppler unit is determined based on a first Doppler frequency and a first distance in the first distance-Doppler graph; and
   recovering second Doppler frequencies of first distance-Doppler units based on first Doppler frequencies and data obtained after Doppler phase compensation is performed for a first time for the first distance-Doppler units in the M*N distance-Doppler graphs.

7. The method according to claim 6, wherein recovering the second Doppler frequencies comprises:
   performing, by using a second Doppler phase compensation amount determined based on a first aliasing coefficient and the order of the transmit antenna $T_x$ in the first transmission sequence, Doppler phase compensation for a second time on data obtained after Doppler phase compensation is performed for the first time for the first distance-Doppler unit in the first distance-Doppler graph, wherein the first aliasing coefficient is any aliasing coefficient in an aliasing coefficient set, and the aliasing coefficient set comprises 0 and a positive integer less than M; and
   recovering the second Doppler frequencies of the first distance-Doppler units based on the first Doppler frequencies and data obtained after Doppler phase compensation is performed for the second time for the first distance-Doppler units in the M*N distance-Doppler graphs.

8. The method according to claim 1, wherein a time period of a signal transmitted by a specific transmit antenna of the M transmit antennas is T, and a signal transmission period for the specific transmit antenna is M*T.

9. A radar system, comprising:
   at least M transmit antennas, at least N receive antennas, a transmitter coupled to the at least M transmit antennas, a receiver coupled to the at least N receive antennas, and at least one processing module, wherein
   the transmitter is configured to sequentially transmit signals according to a first transmission sequence through the M transmit antennas, wherein the first transmission sequence is different from a sequence that is formed by arranging the M transmit antennas based on spatial locations thereof;
   the receiver is configured to receive, through the N receive antennas, echo signals formed by reflection of the transmitted signals off of a target, wherein M and N are positive integers, and M is greater than 2; and
   the at least one processing module is configured to measure a parameter of the target based on the echo signals.

10. The radar system according to claim 9, wherein the first transmission sequence is obtained by transforming an arrangement of at least two transmit antennas in the sequence formed by arranging the M transmit antennas based on the spatial locations.

11. The radar system according to claim 9, wherein any two adjacent transmit antennas in the sequence formed by arranging the M transmit antennas based on the spatial locations are not adjacent in the first transmission sequence.

12. The radar system according to claim 9, wherein the M transmit antennas are M physical antennas.

13. The radar system according to claim 9, wherein the M antennas are obtained by multiplexing at least one of P physical antennas, wherein P is a positive integer, and $3 \leq P \leq M$.

14. The radar system according to claim 9, wherein the at least one processing module comprises a memory and a processor, wherein the processor is coupled to the memory, the transmitter, and the receiver, and the processor is configured to invoke instructions and data that are stored in the memory, to perform the following steps:
   calculating, based on the echo signals, a distance-Doppler graph corresponding to each virtual receive antenna of a plurality of virtual receive antennae, to obtain M*N distance-Doppler graphs, wherein each virtual receive antenna of the plurality is an array element in a virtual MIMO array comprising the M transmit antennas and the N receive antennas, and each distance-Doppler graph is divided into a plurality of distance-Doppler units arranged in an array;
   performing Doppler phase compensation for a first time on data of a first distance-Doppler unit in a first distance-Doppler graph of the distance-Doppler graphs corresponding to the virtual receive antennae by using a first Doppler phase compensation amount that is determined based on an order of a transmit antenna $T_x$ in the first transmission sequence, wherein the first distance-Doppler graph corresponds to any virtual receive antenna in a virtual MIMO subarray corresponding to the transmit antenna $T_x$, the transmit antenna $T_x$ is any transmit antenna in the M transmit antennas, and the first distance-Doppler unit is determined based on a first Doppler frequency and a first distance in the first distance-Doppler graph; and recovering second Doppler frequencies of first distance-Doppler units based on first Doppler frequencies and data obtained after Doppler phase compensation is performed for a first time for the first distance-Doppler units in the M*N distance-Doppler graphs.

15. The radar system according to claim 14, wherein the processor performs the step of recovering second Doppler frequencies by performing, by using a second Doppler phase compensation amount that is determined based on a first aliasing coefficient and the order of the transmit antenna $T_x$ in the first transmission sequence, Doppler phase compensation for a second time on data obtained after Doppler phase compensation is performed for the first time for the first distance-Doppler unit in the first distance-Doppler graph, wherein the first aliasing coefficient is any aliasing coefficient in an aliasing coefficient set, and the aliasing coefficient set comprises 0 and a positive integer less than M; and recovering the second Doppler frequencies of the first distance-Doppler units based on the first Doppler frequencies and data obtained after Doppler phase compensation is performed for the second time for the first distance-Doppler units in the M*N distance-Doppler graphs.

16. The radar system according to claim 9, wherein a time period of a signal transmitted by a specific transmit antenna of the M transmit antennas is T, and a signal transmission period for the specific transmit antenna is M*T.

17. A vehicle, comprising:
a radar system comprising at least M transmit antennas, at least N receive antennas, a transmitter coupled to the at least M transmit antennas, a receiver coupled to the at least N receive antennas, and at least one processor, wherein the transmitter is configured to sequentially transmit signals according to a first transmission sequence through the M transmit antennas, wherein the first transmission sequence is different from a sequence that is formed by arranging the M transmit antennas based on spatial locations thereof;

the receiver is configured to receive, through the N receive antennas, echo signals formed by reflection of the transmitted signals off of a target, wherein M and N are positive integers, and M is greater than 2; and the at least one processor is configured to measure a parameter of the target based on the echo signals.

18. The radar system according to claim 17, wherein any two adjacent transmit antennas in the sequence formed by arranging the M transmit antennas based on the spatial locations are not adjacent in the first transmission sequence.

19. The radar system according to claim 17, wherein the M transmit antennas are M physical antennas.

20. The radar system according to claim 17, wherein the M antennas are obtained by multiplexing at least one of P physical antennas, wherein P is a positive integer, and $3 \leq P \leq M$.

* * * * *